United States Patent [19]
Rohm

[11] Patent Number: 4,905,007
[45] Date of Patent: Feb. 27, 1990

[54] CHARACTER INPUT/OUTPUT DEVICE

[76] Inventor: Samson Rohm, 9933 - 147 Street, Edmonton, Alberta, Canada, T5N 3B6

[21] Appl. No.: 55,739

[22] Filed: May 29, 1987

[51] Int. Cl.⁴ .............................................. G06F 3/00
[52] U.S. Cl. ...................................... 341/173; 341/31; 341/32; 341/33; 341/34; 340/709
[58] Field of Search ............... 340/345, 365 R, 365 S, 340/365 E, 365 L, 365 P, 709, 706; 250/221; 341/23–27, 31–34, 173

[56] References Cited

U.S. PATENT DOCUMENTS

| | | |
|---|---|---|
| T980,008 | 3/1979 | Naylor . |
| 3,881,106 | 4/1975 | Pocker et al. ........................ 250/221 |
| 4,040,010 | 8/1977 | Crane et al. . |
| 4,112,415 | 9/1978 | Hillbrink . |
| 4,199,751 | 4/1980 | Piguet ............................ 340/365 R |
| 4,241,409 | 12/1980 | Nolf ................................. 364/705 |
| 4,250,378 | 2/1981 | Mutton ............................. 250/221 |
| 4,262,281 | 4/1981 | Buckle et al. . |
| 4,366,463 | 12/1982 | Barker ............................ 340/365 L |
| 4,495,644 | 1/1985 | Parks et al. ........................... 382/3 |
| 4,533,827 | 8/1985 | Fincher ............................. 250/221 |
| 4,542,526 | 9/1985 | Saton et al. .......................... 382/13 |
| 4,607,159 | 8/1986 | Goodson et al. ................... 250/221 |
| 4,731,530 | 3/1988 | Mikan ............................... 340/709 |

FOREIGN PATENT DOCUMENTS

| | | |
|---|---|---|
| 1145474 | 3/1926 | Canada . |
| 0200333 | 10/1985 | Japan .............................. 340/365 A |
| 82/03935 | 11/1982 | PCT Int'l Appl. . |
| 85/00683 | 2/1985 | PCT Int'l Appl. . |
| 2148041 | 5/1985 | United Kingdom . |
| 2162982 | 2/1986 | United Kingdom . |

OTHER PUBLICATIONS

Hymes et al.—"Speed Keyboard for Data Processor"—IBM Technical Disclosure Bulletin—vol. 23; No. 2; Jul./80; pp. 838–839.
"Smart Key"; IBM Technical Disclosure Bulletin; vol. 28, No. 5; Oct./85; pp. 1859–1860.
Herot et al.; "One-Point Touch Input of Vector Information for Computer Displays"; Computer Graphics, vol. 12, No. 3; Aug./78, pp. 275–281.
Irwin, Jr.; "Dynamically Adjustable Capacitive Key Sensing Keyboard"; IBM Technical Disclosure Bulletin; vol. 25, No. 8; Jan./83, p. 4097.
Conway; "Digital X Typewriter Keyboard"; IBM Technical Disclosure Bulletin; vol. 18, No. 12, May/76; pp. 4187–4190.
Strnad; "Keyboard Switching Mechanism"; IBM Technical Disclosure Bulletin; vol. 13, No. 4, Sep./70; p. 898.
Ludeman; "Hall Effect Keyboard Including Magnetic Keeper"; IBM Technical Disclosure Bulletin; vol. 14, No. 10, Mar./72; pp. 2924–2925.
Carmichael; "Coded Sphere Joystick"; IBM Technical Disclosure Bulletin; vol. 19, No. 6, Nov./76, pp. 2226–2227.
Kowalski; "Semi-Captive Keyboard"; Xerox Disclosure Journal; vol. 1, No. 2, Feb./76; p. 85.
McCornack; "Single Keybutton Four-Way Switch", IBM Technical Disclosure Bulletin; vol. 21, No. 8, Jan./79; p. 3261.
Tseng; "Opto-Magnetic Input Tablet or Keyboard"; IBM Technical Disclosure Bulletin; vol. 22, No. 12; May/80; pp. 5477–5478.
Wolfger Schneider; "Communicating in Code"; Creative Computing; Oct./83; pp. 222–232.
Microwriter Ltd.; "Write into Type"; Advertising Brochure; 2 pages.
Microwriter Ltd.; "At Work"; Advertising Brochure; 2 pages.
Microwriter Ltd.; "New User's Guide"; May/82; pp. 1–51.
A. LaPlante, 'Smartcards' Sporting Micros Hit the Market, "InfoWorld", Mar./86, 1 page.

Primary Examiner—David K. Moore
Assistant Examiner—M. Fatahi-Yar
Attorney, Agent, or Firm—Davis, Bojold & Streck

[57] ABSTRACT

A character input device for a computer comprised of a plurality of switches or threshold zones adapted to be activated by a disk movable with the tip of a pen in preset serial patterns.

21 Claims, 15 Drawing Sheets

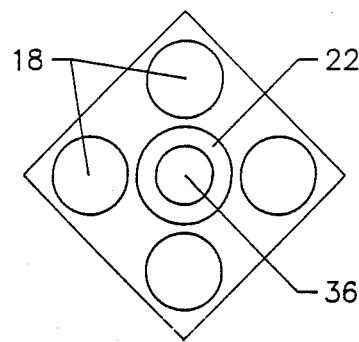
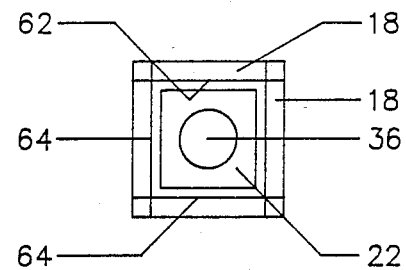
FIGURE 24
FIGURE 26
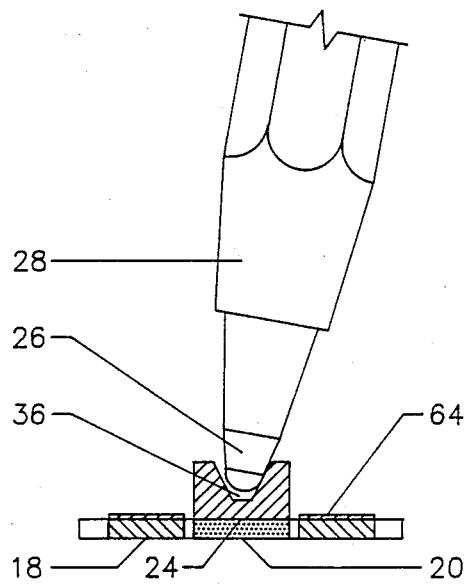
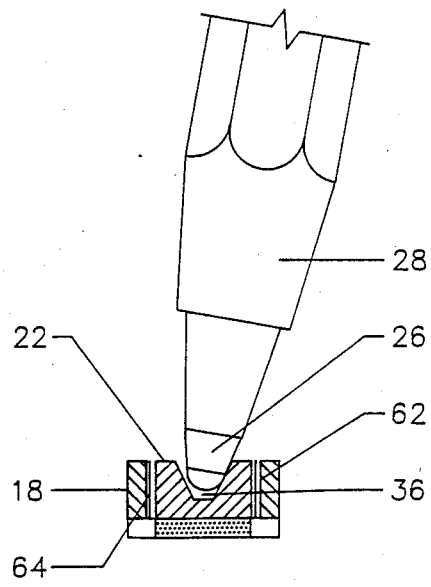
FIGURE 25
FIGURE 27

CHARACTER INPUT/OUTPUT DEVICE

The present invention relates to character input device for use with a computer.

BACKGROUND OF THE INVENTION

Computers have been developed which are the size of credit cards. A break through is required with respect to the miniaturization of character input devices before the full potential of credit card computers can be realized.

The character input device most commonly employed in connection with computers remains the Qwerty keyboard as developed for use in typewriters almost a century ago. Attempts have been made to miniaturize this keyboard, however these attempts have not met with success. A miniature Querty keyboard on which the keys are activated with the tip of a pen is not efficient, as the human hand obscures the keyboard and speed is lost when the operator must "hunt and peck" the multiplicity of keys. Efforts have been made to miniaturize the keyboard by reducing the number of keys required. This can be done by having characters entered by pressing two or more keys in combination. The problem with this type of keyboard is that it still is limited by the size of the fingers of the human hand required to activate the keys and a reduction in the number of keys inevitably reduces the number of potential characters, thereby limiting use.

Efforts have been made to develop handwriting decoders, as an alternative to keyboards. These input devices are capable of "reading" a person's printing or handwriting. In theory, this would be an ideal system as it would have all the flexibility and portability of handwriting combined with the speed and clarity of typing. In practice these devices have met with numerous problems. All operable devices are complex as the characters they must decode tend to vary with the handwriting style of the operator. The size of the input mechanism is necessarily limited by the smallest character a human can accurately and consistently write. Interactive feedback is required due to the possibility that characters may not be recognized.

SUMMARY OF THE INVENTION

The primary object of the present invention is to provide a character input device for a computer which is capable of a greater degree of miniaturization than prior art devices.

Broadly, the present invention provides a character input device for a computer comprised of a plurality of selection recognition means adapted to be activated by movable selection means in preset serial patterns.

BRIEF DESCRIPTION OF THE DRAWINGS

These and other features of the invention will become more apparent from the following description in which reference is made to the appended drawings, wherein:

FIG. 24 is a top plan view of a preferred embodiment of the invention utilizing insulated conductive plates horizontally aligned.

FIG. 25 is a partially cut away side plan view of a preferred embodiment of the invention utilizing insulated conductive plates horizontally aligned.

FIG. 26 is a top plan view of a preferred embodiment of the invention utilizing insulated conductive plates vertically aligned.

FIG. 27 is a partially cut away side plan view of a preferred embodiment of the invention utilizing insulated conductive plates vertically aligned.

DETAILED DESCRIPTION OF THE PREFERRED EMBODIMENT

Figure 1:
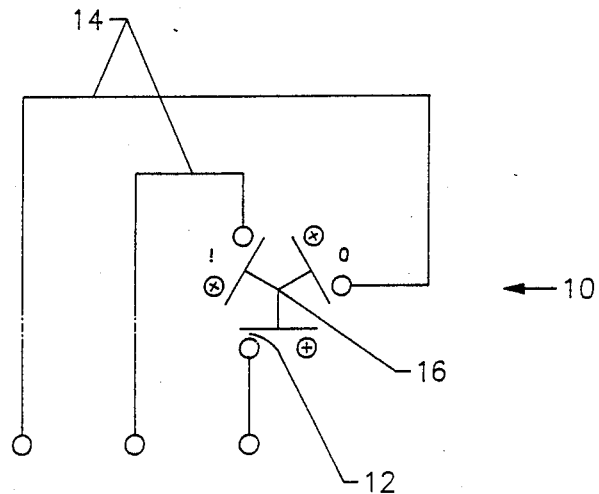
FIG. 1 is a schematic representation of an alternate embodiment of the invention utilizing three switches.
Figure 2:
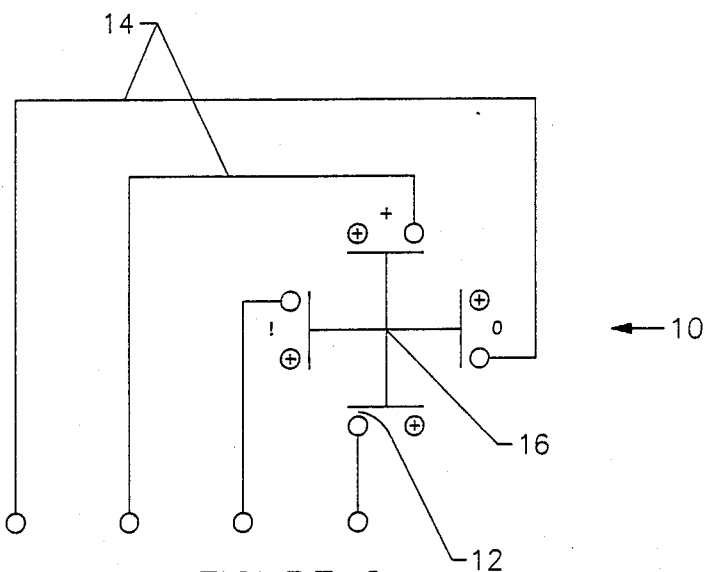
FIG. 2 is a schematic representation of a preferred embodiment of the invention utilizing four switches.
Figure 3:
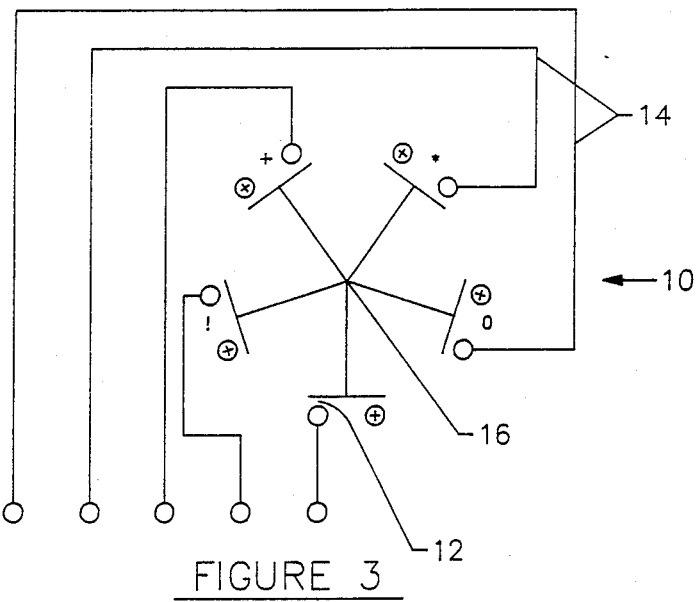
FIG. 3 is a schematic representation of an alternate embodiment of the invention utilizing five switches.
Figure 4:
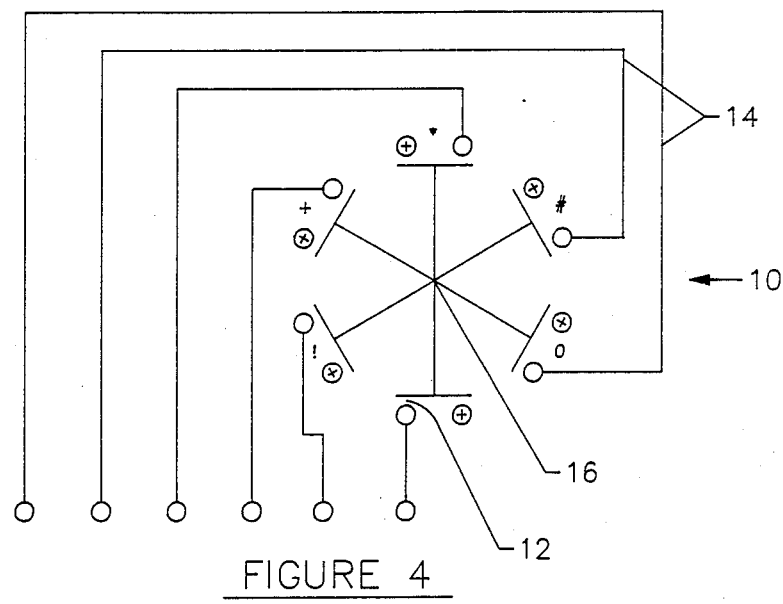
FIG. 4 is a schematic representation of a preferred embodiment of the invention utilizing six switches.
Figure 5:
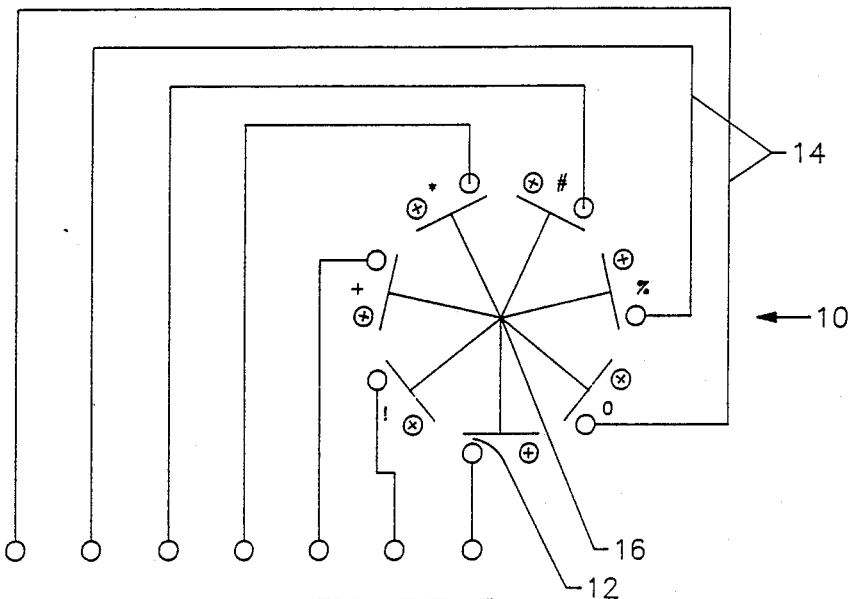
FIG. 5 is a schematic representation of an alternate embodiment of the invention utilizing seven switches.
Figure 6:
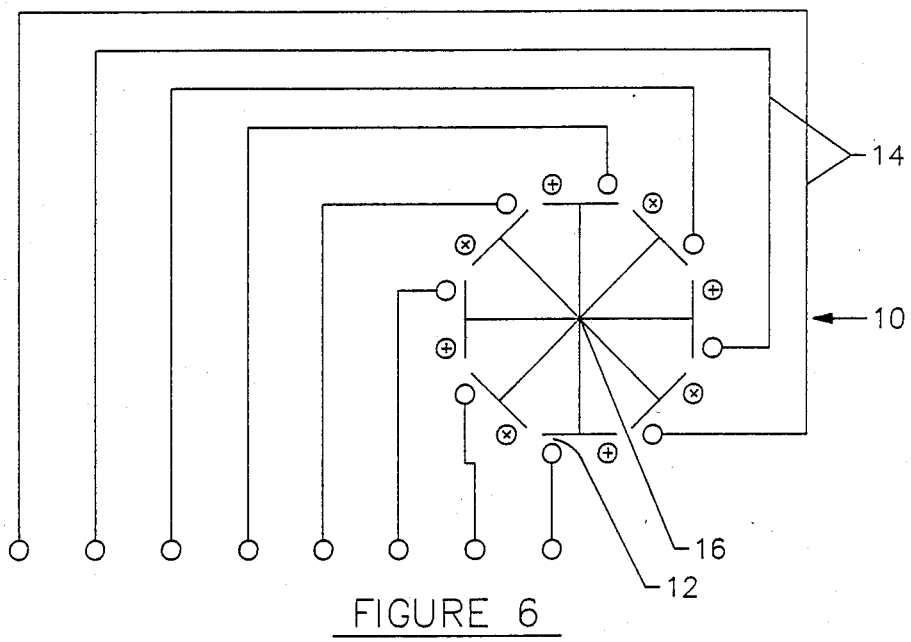
FIG. 6 is a schematic representation of an alternate embodiment of the invention utilizing eight switches.

The preferred embodiment will now be described with reference to FIGS. 1 through 43.

Illustrated in FIGS. 8 through 43 are a number of preferred embodiments which may be used to put the invention into practice once the underlying principles of the invention are understood. The underlying principles which will be hereinafter described involve a consideration of our alphabet as a character set, and the mathematical relationship between characters in differing character sets.

The number of unique characters in a character set is the "base" of that character set. For example, our number system is considered as base 10. We use 10 characters when counting; 0, 1, 2, 3, 4, 5, 6, 7, 8, and 9. To represent a value larger than the size of the "base" character set requires the combined use of one or more characters from the set. In our number system, for example, we continue counting 10, 11, 12, 13, 14, etc. until we have exhausted all two character combinations, then we combine three characters to continue counting 100, 101, 102, 103, 104, etc. In advanced mathematics it is recognized that it is possible to convert characters from one base character set to a character set with a different base. Each character has a "positional value" within its base character set, which can be represented by a character having an equivalent "positional value" in a different base character set.

Our alphabet has 26 letters and as such is a base 26 character set. We would only be able to have 26 words in our language were it not for the combinations of characters which we form into words. The underlying principle of this invention is that the characters of an alpha-numeric character set may be represented by combinations of characters having equivalent positional value from a reduced base character set. The preferred base systems which can be used are base 3 and base 5, with the character input devices having four and six switches respectively in order that one switch may be dedicated to signalling to the computer the end of a transmission sequence.

Figure 7:
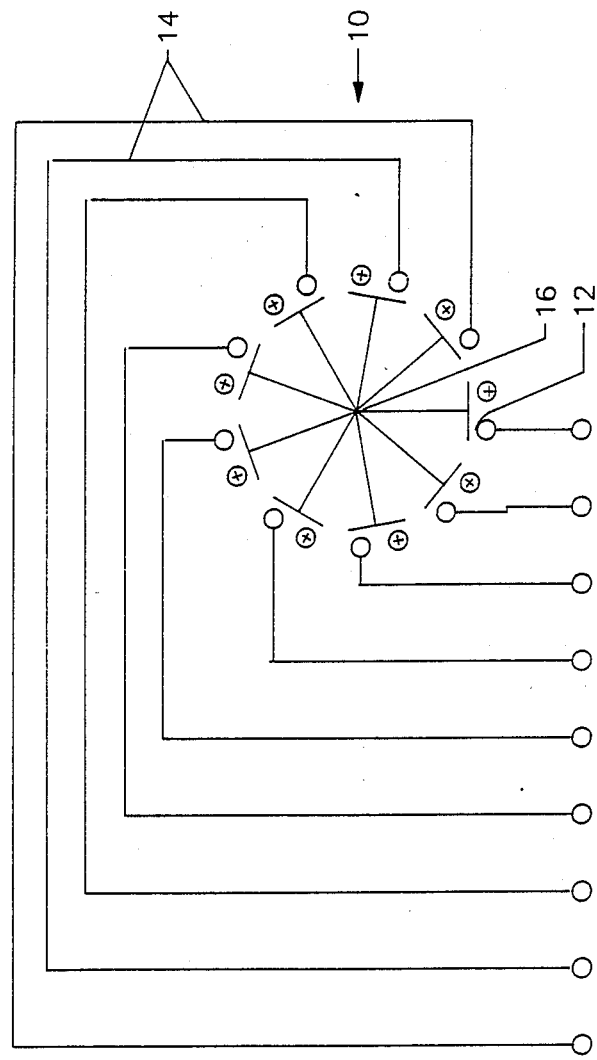
FIG. 7 is a schematic representation of an alternate embodiment of the invention utilizing nine switches.

The character input device, generally designated as 10, is shown in schematic form in FIGS. 1 through 7. Character input device 10 has a plurality of switches 12 for data input. The input device can be configured to operate with as few as three switches as illustrated in FIG. 1 or as many as nine switches as illustrated in FIG. 7 depending upon the reduced character set which is selected. FIGS. 1 through 7 are merely for purposes of illustration as it is possible for character input device 10 to have a greater number of switches than is illustrated. The key factor is that each of the switches must uniquely represent a character of the reduced character set.

The computer must be able to recognize the end of a transmission sequence. The computer can either be programmed to consider the transmission sequence at an end after a specified number of characters have been entered or, preferably, one additional switches is added to character input device 10 which is dedicated to signalling to the computer the end of a transmission sequence. Each of switches 12 are connected by links 14 to a power source and the input terminals of a computer. It has been found to be particularly advantageous if switches 12 preferably are oriented about a central point 16.

Instead of switches which are either in an "off" or "on" position, character input device 10 may be comprised of a plurality of zones, with means for measuring the direction and threshold magnitude of movement of selection means to determine whether a selection has been made, as will be hereinafter described.

It is not important how the switches or threshold zones are activated, this can be accomplished by the direct motion of fingers of a human hand, if desired. In order to achieve a greater degree of miniaturization it has been found that the tip of a pointed instrument such as a pen is particularly suited for the task.

A number of preferred embodiments of the invention will now be described as illustrated in FIGS. 8 through 41. One skilled in the art will appreciate that although not shown in FIGS. 8 through 41, each embodiment must have links 22 connecting character input device 10 to a power source and the input terminal of a computer. The illustrations have been made larger than actual scale for clarity, some of the preferred embodiments of the invention as hereinafter described have been built as small as 2 milli-meters square.

Figure 8:
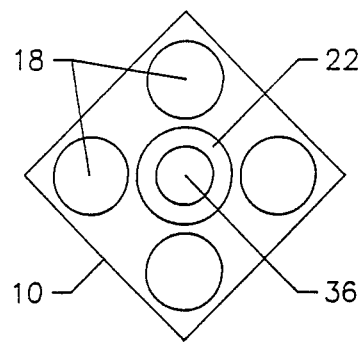
FIG. 8 is a top plan view of a preferred embodiment of the invention utilizing conductive plates horizontally aligned.
Figure 10:
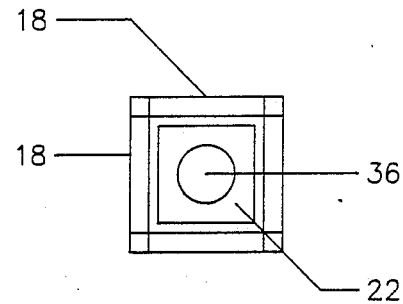
FIG. 10 is a top plan view of a preferred embodiment of the invention utilizing conductive plates vertically aligned.
Figure 9:
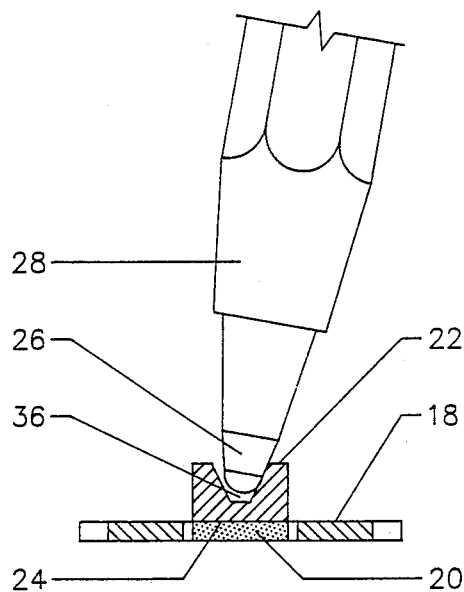
FIG. 9 is a partially cut away side plan view of a preferred embodiment of the invention utilizing conductive plates horizontally aligned.
Figure 11:
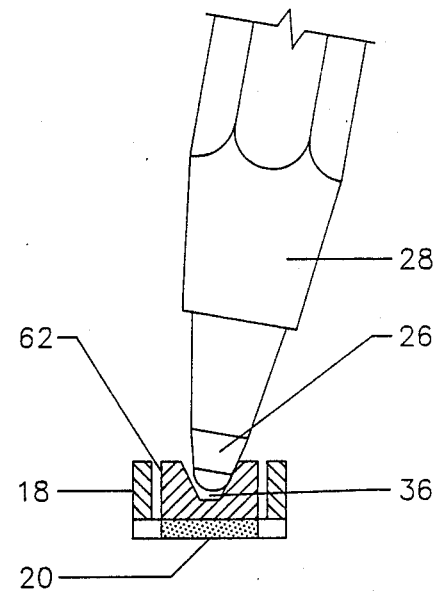
FIG. 11 is a partially cut away side plan view of a preferred embodiment of the invention utilizing conductive plates vertically aligned.
Figure 22:
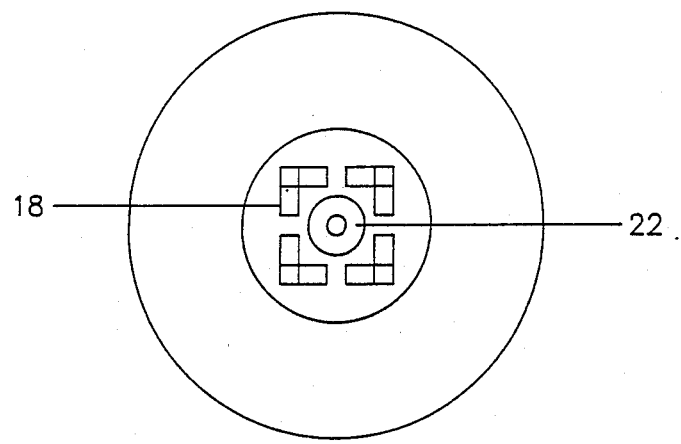
FIG. 22 is a top plan view of a preferred embodiment of the invention utilizing an electrically charged cantilever beam.
Figure 23:
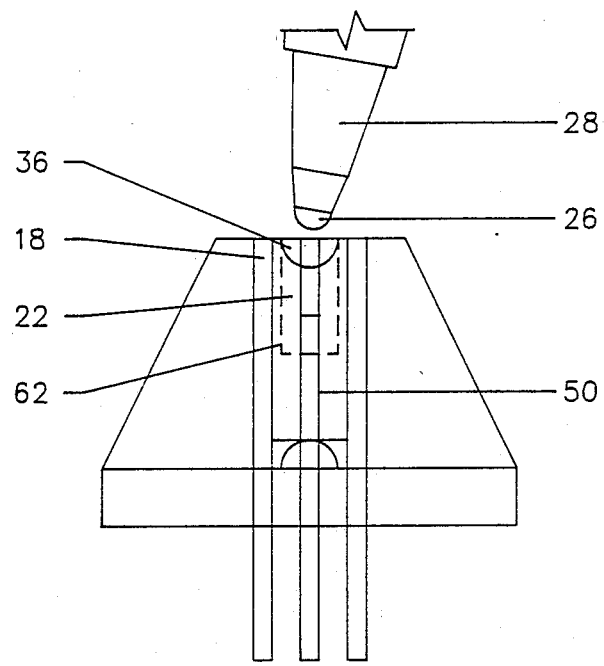
FIG. 23 is a partially cut away side plan view of a preferred embodiment of the invention utilizing an electrically charged cantilever beam.

One preferred embodiment of the invention illustrated in FIG. 8 shows a character input device 10 which is comprised of four conductive plates 18 surrounding a charged centre plate 20. A disk 22 having a conductive bottom surface 24 is centred upon and movable about centre plate 20. Disk 22 has an indentation 36 into which the tip 26 of a pointed instrument such as a pen 28 can be inserted, as best illustrated in FIG. 9. Disk 22 is moved by exerting pressure with tip 26 of pen 28 upon indentation 36. When disk 22 is moved into contact with one of conductive plates 18 an electrical circuit is completed with centre plate 20. In order to further miniaturize the preferred embodiment, conductive plates 18 can be placed on a vertical plane in relation to charged centre plate 20, as is illustrated in FIGS. 10 and 11. In order for this embodiment to be operable disk 22 must have conductive side surfaces 62. A further variation of this basic configuration is illustrated in FIGS. 22 and 23. As best illustrated in FIG. 23 disk 22 can be placed upon a cantilever beam 50. Cantilever beam 50 is charged with electric current which is communicated to conductive side surfaces 62 on disk 22. Conductive plates 18 are vertically aligned. When tip 26 of pen 28 exerts a force upon indentation 36 of disk 22, cantilever beam 50 flexes permitting conductive side surfaces 62 of disk 22 to contact conductive plates 18 completing an electrical circuit with electrically charged cantilever beam 50. Once a selection has been made cantilever beam 50 returns to a central position at centre point 16. It has been found that the embodiment using cantilever beam 50 is easier to use if conductive plates are placed in the corners as illustrated in FIG. 22, as this orients the user to the current position of tip 26 of pen 28.

Figure 12:
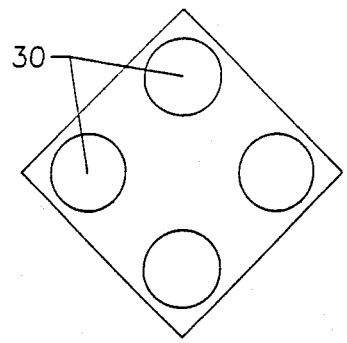
FIG. 12 is a top plan view of a preferred embodiment of the invention utilizing membrane switches horizontally aligned.
Figure 14:
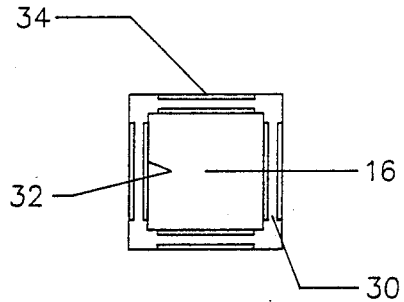
FIG. 14 is a top plan view of a preferred embodiment of the invention utilizing membrane switches vertically aligned.
Figure 13:
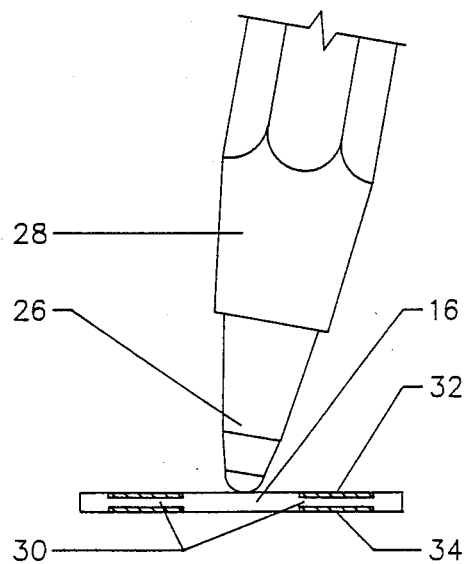
FIG. 13 is a partially cut away side plan view of a preferred embodiment of the invention utilizing membrane switches horizontally aligned.
Figure 15:
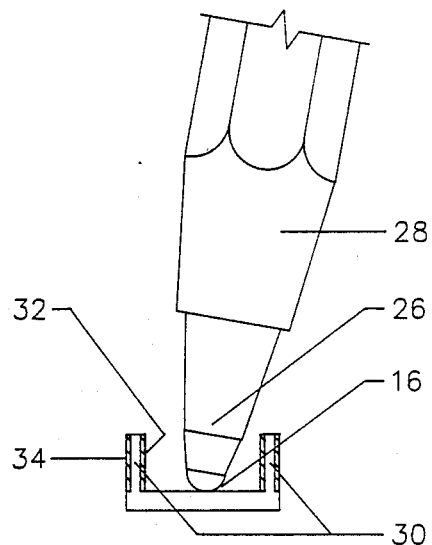
FIG. 15 is a partially cut away side plan view of a preferred embodiment of the invention utilizing membrane switches vertically aligned.
Figure 16:
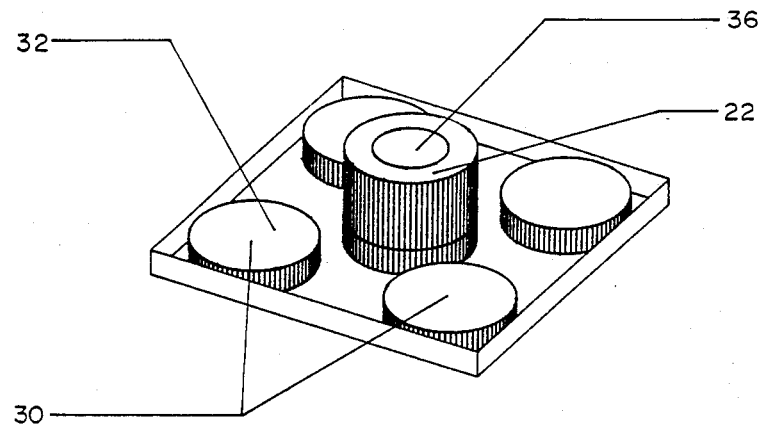
FIG. 16 is a perspective view of a preferred embodiment of the invention utilizing membrane switches horizontally aligned activated by a movable disk.
Figure 17:
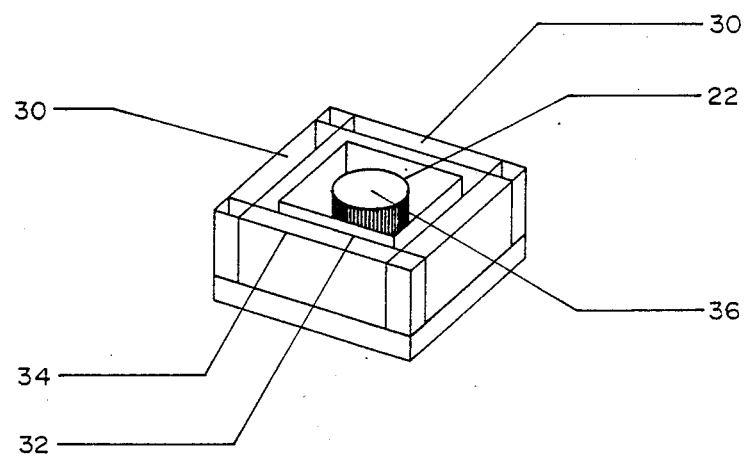
FIG. 17 is a perspective view of a preferred embodiment of the invention utilizing membrane switches vertically aligned activated by a movable disk.

Another preferred embodiment of the invention as illustrated in FIGS. 12 and 13, shows a character input device 10 which is comprised of four membrane switches 30. Each of membrane switches 30 have contact surfaces 32 and 34, which are activated by pressing on a selected membrane switch 30 with tip 26 of pen 28 such that contact surfaces 32 and 34 come into contact completing an electrical circuit. Membrane switches 30 are arranged around a centre point 16 in order to limit the movement required by pen 28 and provide a surface upon which to rest pen 28 between character input strokes. In order further miniaturize character input device 10, membrane switches 30 may be placed on a vertical plane with respect to centre point 16, as is illustrated in FIGS. 14 and 15. Membrane switches 30 can also be activated by disk 22, as is illustrated in FIGS. 16 and 17.

Figure 18:
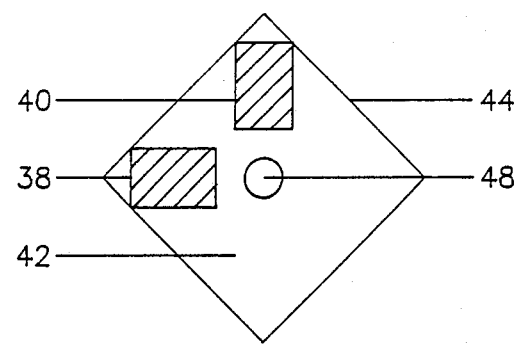
FIG. 18 is a top plan view of a preferred embodiment of the invention utilizing strain gauges horizontally aligned.
Figure 19:
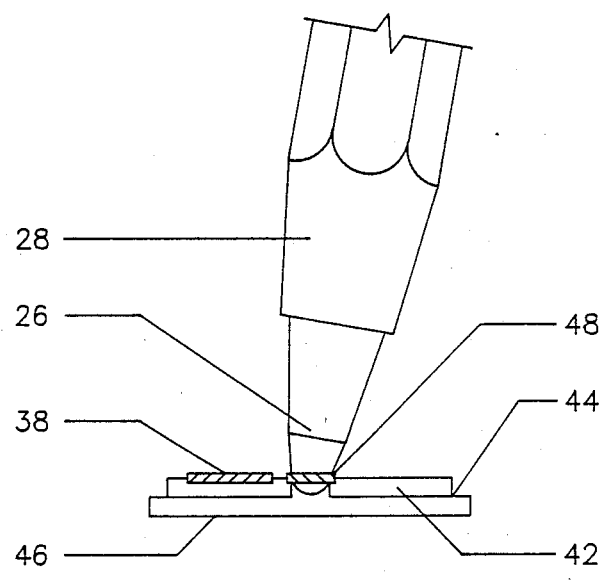
FIG. 19 is a partially cut away side plan view of a preferred embodiment of the invention utilizing strain gauges horizontally aligned.

Another preferred embodiment of the invention as illustrated in FIGS. 18 and 19, shows a character input device 10 which uses two strain gauges 38 and 40 which are mounted to a elastic material 42 which rests upon and is affixed to the edges 44 of a supporting surface 46. Strain gauges 38 and 40 are arranged such that strain gauge 38 measures forces applied in a direction which is perpendicular to the forces measured by strain gauge 40. Arranging strain gauges 38 and 40 to measure forces in differing directions allows the division of the surface of elastic material 42 into zones. Each of the zones represents a selection option. As will be apparent to one skilled in the art the use of strain gauges 38 and 40 can be used to create four zones with four selection options. In order that tip 26 of pen 28 may be used to make selections without damaging elastic material 42 a reinforced opening 48 is positioned on elastic material 42. When tip 26 of pen 28 is inserted into and applies a force in the direction of one of the zones to reinforced opening 48 strain gauges 38 and 40 measure the direction and threshold magnitude of the force to determine whether a selection has been made.

Figure 20:
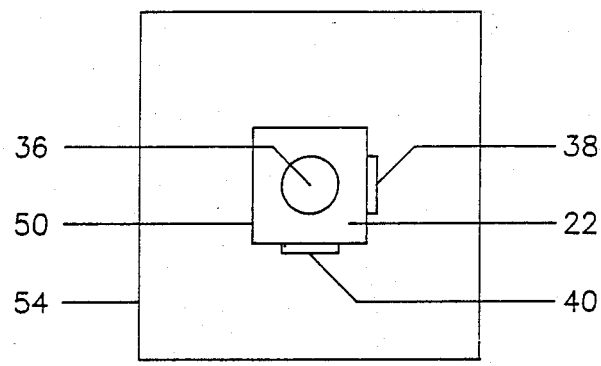
FIG. 20 is a top plan view of a preferred embodiment of the invention utilizing strain gauges vertically aligned on a cantilever beam.
Figure 21:
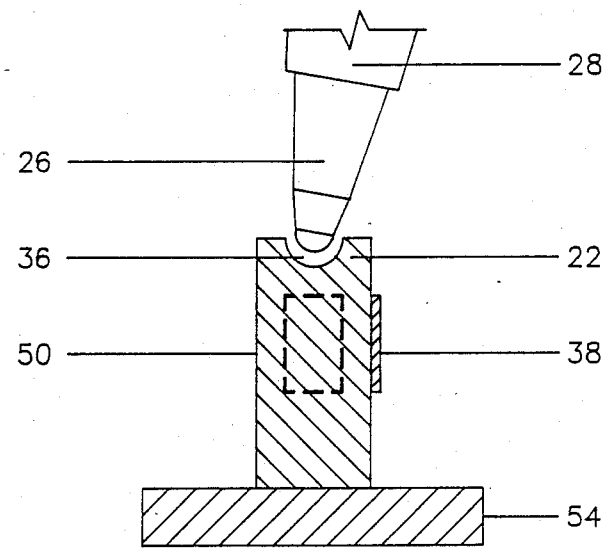
FIG. 21 is a partially cut away side plan view of a preferred embodiment of the invention utilizing strain gauges vertically aligned on a cantilever beam.

Another preferred embodiment of the invention is illustrated in FIGS. 20 and 21 shows a character input device 10 which is comprised of a cantilever beam 50 having one end 52 fixed to a base 54 and an opposed end 56 extending vertically from base 54. Two strain gauges 38 and 40 are mounted to sides 58 and 60 respectively of cantilever beam 50 such that they measure forces applied in differing directions in relation to the vertical orientation of cantilever beam 50. A disk 22 is positioned on opposed end 56 of cantilever beam 50. Disk 22 has an indentation 36 which is adapted to receive tip 26 of pen 28 in order that a force may be exerted to cantilever beam 50 to make a selection. Strain gauges 38 and 40 measure the direction and threshold magnitude of movement of cantilever beam 50 to determine whether a selection has been made.

Another preferred embodiment of the invention is illustrated in FIGS. 24 and 25, which shows a character input device 10 comprised of four conductive plates 18 surrounding a charged centre plate 20. Each of conductive plates 18 have a thin insulating coating 64. A disk 22 having a conductive bottom surface 24 is centred upon and movable about centre plate 20 whereby changes in capacitance may be effected by movement of disk 22 toward one of conductive plates 18. When a tip 26 of pen 28 is inserted into indentation 36 of disk 22 and force is exerted to move disk 22 in a selected direction the threshold magnitude of changes in capacitance is measured in relation to a starting capacitance level when disk 22 is centred on plate 20 to determine whether a selection has been made. In order to further miniaturize character input device 10, conductive plates 18 with insulating coating 64 may be placed on a vertical plane with respect to disk 22 as illustrated in FIGS. 26 and 27. Disk 22 has conductive side surfaces 62 and is prevented from coming into contact with conductive plates 18 by insulating coating 64. Insulating coating 64 is elastic such that disk 22 can move toward conductive plates 18 to create a change in capacitance.

Figure 28:
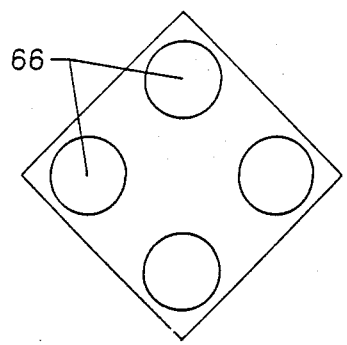
FIG. 28 is a top plan view of a preferred embodiment of the invention utilizing membrane capacitors horizontally aligned.
Figure 30:
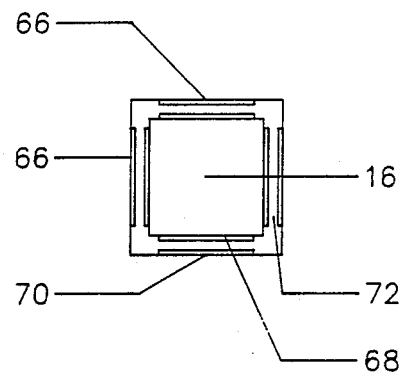
FIG. 30 is a top plan view of a preferred embodiment of the invention utilizing membrane capacitors vertically aligned.
Figure 29:
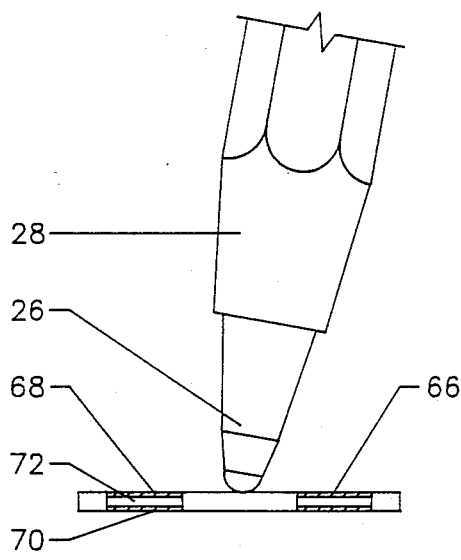
FIG. 29 is a partially cut away side plan view of a preferred embodiment of the invention utilizing membrane capacitors horizontally aligned.
Figure 31:
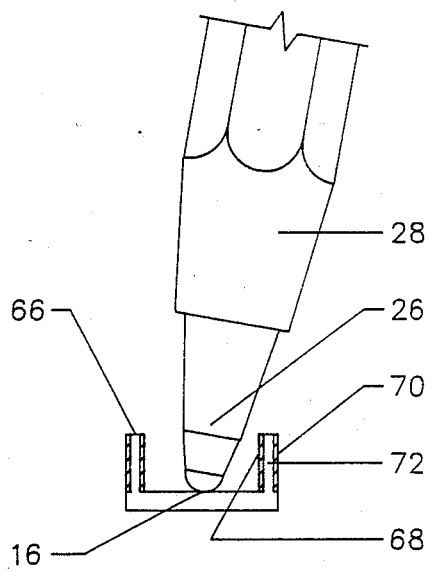
FIG. 31 is a partially cut away side plan view of a preferred embodiment of the invention utilizing membrane capacitors vertically aligned.

Another preferred embodiment of the invention is illustrated in FIGS. 28 and 29, which shows a character input device 10 comprised of four membrane capacitors 66. Each of membrane capacitors 66 have contact surfaces 68 and 70 separated by a thin insulating material 72. Membrane capacitors 66 are activated by pressing on a selected membrane capacitor 66 with the tip 26 of a pen 28 to move contact surfaces 68 and 70 closer together and thereby increase the capacitance in the selected membrane capacitor 66. The threshold magnitude of changes in capacitance when contact surfaces 68 and 70 come closer together is measured to determine whether a selection has been made. In order to further miniaturize character input device 10 membrane capacitors 66 can be placed on a vertical plane in relation to a centre point 16, which is provided to rest tip 26 of pen 28 between character input strokes, as is illustrated in FIGS. 30 and 31.

Figure 32:
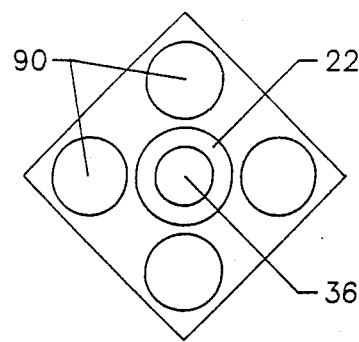
FIG. 32 is a top plan view of a preferred embodiment of the invention utilizing hall effect sensors horizontally aligned.
Figure 34:
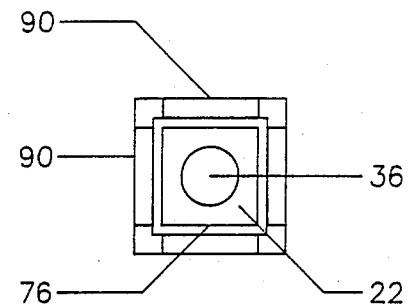
FIG. 34 is a top plan view of a preferred embodiment of the invention utilizing hall effect sensors vertically aligned.
Figure 33:
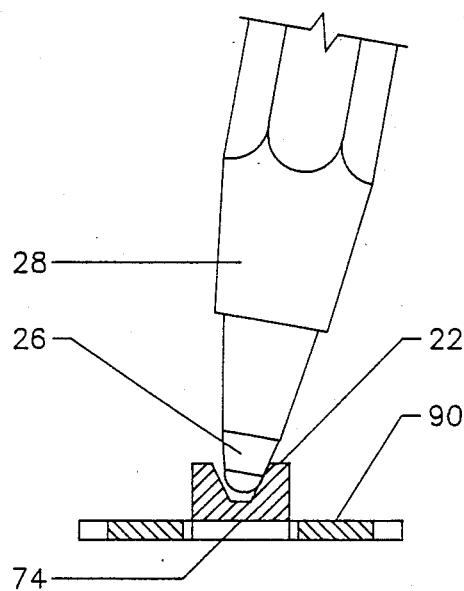
FIG. 33 is a partially cut away side plan view of a preferred embodiment of the invention utilizing hall effect sensors horizontally aligned.
Figure 35:
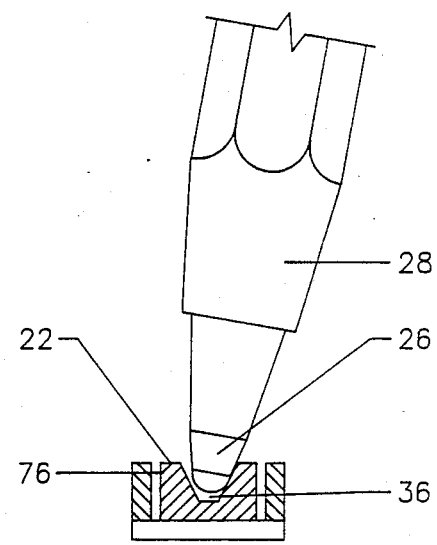
FIG. 35 is a partially cut away side plan view of a preferred embodiment of the invention utilizing hall effect sensors vertically aligned.

Another preferred embodiment of the invention is illustrated in FIGS. 32 and 33, which shows a character input device 10 comprised of four hall effect sensors 90. A movable disk 22 having a magnetic bottom surface 74 is positioned at a centre point 16 between hall effect sensors 90. Changes in voltage may be effected upon movement of disk 22 toward one of hall effect sensors 90. The threshold magnitude of changes in voltage upon movement of disk 22, in relation to a starting voltage level, is measured to determine whether a selection has been made. In order to further miniaturize character input device 10, hall effect sensors 90 may be placed on a vertical plane in relation to disk 22, as is illustrated in FIGS. 34 and 35. When hall effect sensors 90 are placed on a vertical plane, side surfaces 76 of disk 22 should be magnetic in order for the desired change in voltage to be achieved.

Figure 36:
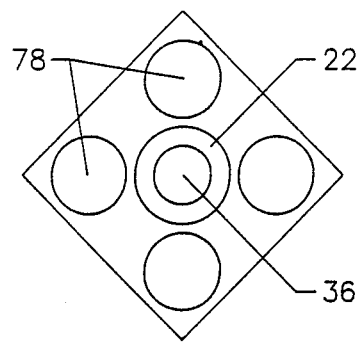
FIG. 36 is a top plan view of a preferred embodiment of the invention utilizing photo-transistors, and a single light emitting diode.
Figure 37:
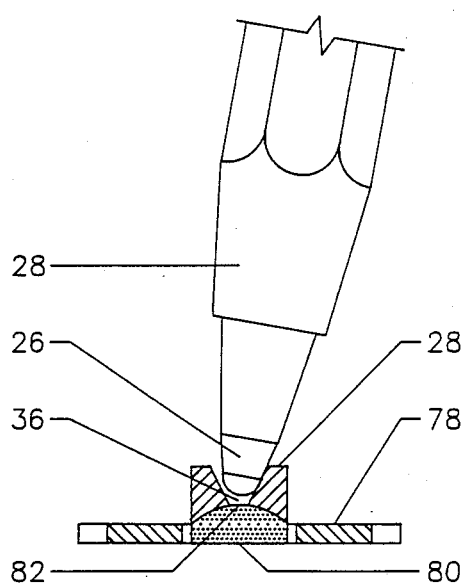
FIG. 37 is a partially cut away side plan view of a preferred embodiment of the invention utilizing photo-transistors, and a single light emitting diode.

Another preferred embodiment of the invention is illustrated in FIGS. 36 and 37, which shows a character input device 10 comprised of four photo-transistors 78 surrounding a light emitting diode 80. A disk 22 having a concave reflective bottom surface 82 is centred upon and movable about diode 80 such that as disk 22 is moved toward one of photo-transistors 78 light is reflected by reflective bottom surface 82 of disk 22 from diode 80 to one of photo-transistors 78 thereby increasing the voltage in photo-transistor 78. The threshold magnitude of changes in voltage upon movement of disk 22, in relation to a starting voltage level when disk 22 is centred on diode 80, is measured to determine whether a selection has been made.

Figure 38:
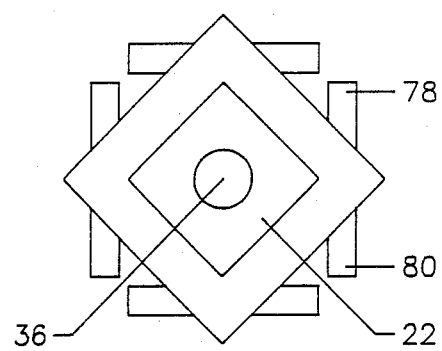
FIG. 38 is a top plan view of a preferred embodiment of the invention utilizing photo-transistor and light emitting diode pairs.
Figure 39:
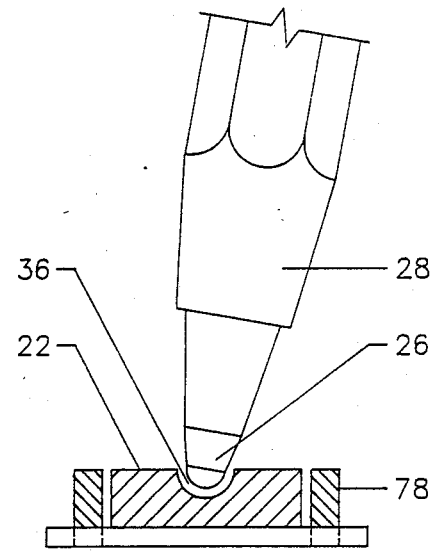
FIG. 39 is a partially cut away side plan view of a preferred embodiment of the invention utilizing photo-transistor and light emitting diode pairs.

Another preferred embodiment of the invention is illustrated in FIGS. 38 and 39, which shows a character input device 10 comprised of four photo-transistors 78 and light emitting diode 80 pairs. Pairs 78 and 80 are arranged such that a beam of light from each of diodes 80 is focused on one of photo-transistors 78. A movable disk 22 is adjacent the beams of light such that movement of disk 22 results in the beam of light between one photo-transistor 78 and light emitting diode 80 pair being disrupted.

Figure 40:
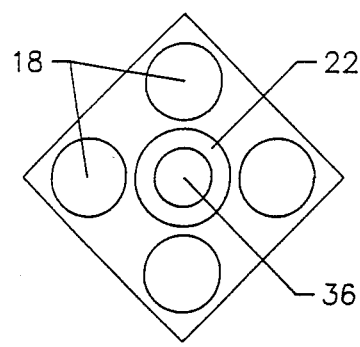
FIG. 40 is a top plan view of a preferred embodiment of the invention utilizing conductive plates horizontally aligned activated by a movable disk imbedded in carbon impregnated elastomer.
Figure 42:
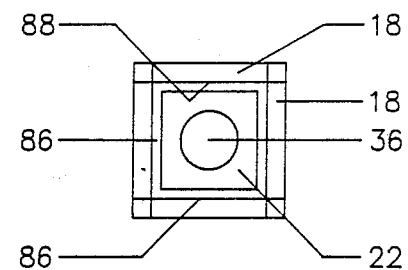
FIG. 42 is a top plan view of a preferred embodiment of the invention utilizing conductive plates vertically aligned activated by a movable disk imbedded in carbon impregnated elastomer.
Figure 41:
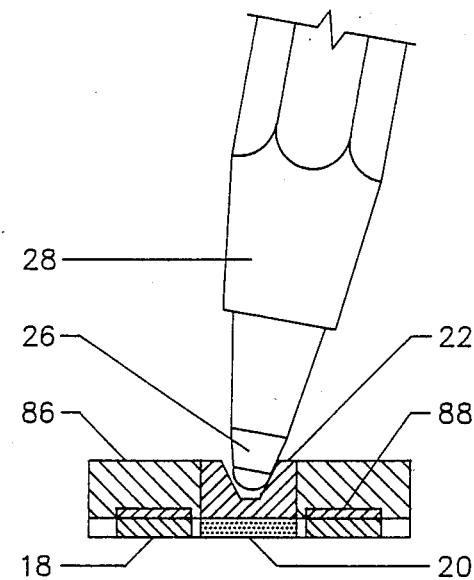
FIG. 41 is a partially cut away side plan view of a preferred embodiment of the invention utilizing conductive plates horizontally aligned activated by a movable disk imbedded in carbon impregnated elastomer.
Figure 43:
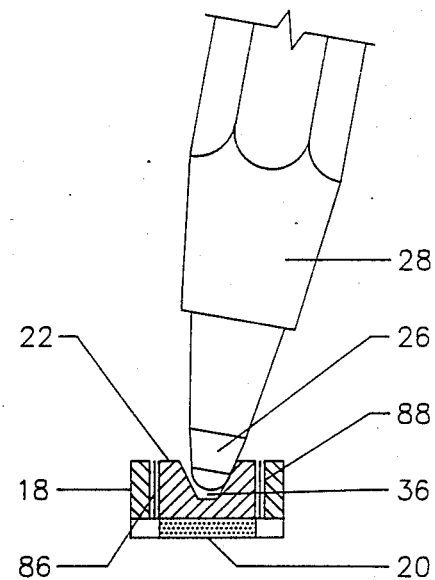
FIG. 43 is a partially cut away side plan view of a preferred embodiment of the invention utilizing conductive plates vertically aligned activated by a movable disk imbedded in carbon impregnated elastomer.

Another preferred embodiment of the invention is as illustrated in FIGS. 40 and 41, which shows a character input device 10 comprised of four conductive plates 18 surrounding a charged centre plate 20. A disk 22 is centred upon and movable about centre plate 20. Disk 22 is encased in a thin sheet of carbon impregnated elastomer material 86 which is bonded to conductive plates 18 at points 88. When a force is applied by tip 26 of pen 28 to indentation 36 of disk 22, elastomer material 86 is compressed permitting disk 22 to move closer to one of conductive plates 18. The movement of disk 22 effects a change in voltage. The threshold magnitude of changes in voltage in relation to a starting voltage level with disk 22 centred on centre plate 20, is measured to determine whether a selection has been made. In order to further miniaturize character input device 10, conductive plates may be placed in a vertical plane in relation to centre plate 20, as is illustrated in FIGS. 42 and 43.

All of the devices illustrated in FIGS. 8 through 43, operate with a reduced base character set being used for input purposes. The reduced base character sets are of such importance to the operation of the device that copies of character sets from base 2 to base 8, are contained in TABLES 1 through 7, respectively, which are annexed as a schedule to this specification in order to make a complete disclosure of the invention. The character sets contained in TABLES 1 through 7 are derived by a conversion of the positional value of the ASCII character set to the selected base character set.

One skilled in the art will appreciate that the reduced character set can be optimised by ensuring that the minimum number of input strokes are required for the most used characters. As part of the optimization process the relationship between certain characters must be rationalized. An example of this is the relationship between uppercase and lower case lettering. In an optimised system the upper and lower case input for a character of the alphabet bear a close resemblance so the operator may more readily commit the codes to memory. Optimised character sets for the preferred base systems, base 3 and base 5 are contained in TABLES 8 and 9, respectively. The human memory only has a capacity to readily recall a limited number of characters; by optimising the character set it facilitates memorization which enhances input speed. The characters contained in TABLES 1 through 9, have been assigned base 10 numbers, in order that one skilled in the art may review the steps which were taken in optimising TABLES 8 and 9.

It will be apparent to one skilled in the art that once the underlying principle of a reduced character set is known, and the operation of the preferred embodiments is understood numerous variations may be made to the configuration and operation of the preferred embodiments without departing from the substance of the invention.

A description of the operation of the preferred embodiment will now be given using the optimised base 3 character set as illustrated in Table 8. The operation described is the same for any one of the preferred embodiments illustrated in FIGS. 9 through 43. For the purpose of our description we will assign to our four switches or selection zones the symbols 0, +, !, and send. Using these switches to input the word "Canada", we first position the tip 26 of pen 28. This will place tip 26 at centre point 16, in indentation 36 of disk 22 or reinforced opening 48 of elastic material 42, depending upon the embodiment selected. By applying a force to pen 28 we make a selection of one of the three available characters, 0, +, !. The first letter of our word "Canada" requires an upper case "C". This requires an input of 0!!!, as set forth in TABLE 8. Once the selections are made for the upper case "C", the send switch is selected to signal to the computer the end of the transmission sequence. The balance of the word would thus be entered, "a"-!!!-send, "n"-+++-send, "a"-!]!-send, "d"-!+!-send, and "a"-!!!-send. A selection +-send, would then be made to leave a space prior to entering the next word of the sentence.

TABLE 1

For a BASE 2 or binary system (we shall represent our BASE 2 characters as '!' & '0') we will have one switch for each of the binary characters plus one SEND switch for a total of three switches.

| DEC BASE 10 | BINARY BASE 2 | ASCII BASE 128 | SYMBOL DESCRIPTION | DECIMAL BASE 10 | BINARY BASE 2 | ASCII BASE 128 | SYMBOL DESCRIPTION |
|---|---|---|---|---|---|---|---|
| 0 | 0 | NULL | NULL | 64 | !00 0000 | @ | AT SIGN |
| 1 | ! | Ctrl A | CONTROL A | 65 | !00 000! | A | UPPERCASE A |
| 2 | !0 | Ctrl B | CONTROL B | 66 | !00 00!0 | B | UPPERCASE B |
| 3 | !! | Ctrl C | CONTROL C | 67 | !00 00!! | C | UPPERCASE C |
| 4 | !00 | Ctrl D | CONTROL D | 68 | !00 0!00 | D | UPPERCASE D |
| 5 | !0! | Ctrl E | CONTROL E | 69 | !00 0!0! | E | UPPERCASE E |
| 6 | !!0 | Ctrl F | CONTROL F | 70 | !00 0!!0 | F | UPPERCASE F |
| 7 | !!! | <BELL> | CONTROL G | 71 | !00 0!!! | G | UPPERCASE G |
| 8 | !000 | <BS> | BACKSPACE | 72 | !00 !000 | H | UPPERCASE H |
| 9 | !00! | <HTAB> | HORIZONTAL TAB | 73 | !00 !00! | I | UPPERCASE I |
| 10 | !0!0 | <LF> | LINEFEED | 74 | !00 !0!0 | J | UPPERCASE J |
| 11 | !0!! | <VTAB> | VERTICAL TAB | 75 | !00 !0!! | K | UPPERCASE K |
| 12 | !!00 | <FF> | FORMFEED | 76 | !00 !!00 | L | UPPERCASE L |
| 13 | !!0! | <CR> | CARRIAGE RETURN | 77 | !00 !!0! | M | UPPERCASE M |
| 14 | !!!0 | Ctrl N | CONTROL N | 78 | !00 !!!0 | N | UPPERCASE N |
| 15 | !!!! | Ctrl O | CONTROL O | 79 | !00 !!!! | O | UPPERCASE O |
| 16 | ! 0000 | Ctrl P | CONTROL P | 80 | !0! 0000 | P | UPPERCASE P |
| 17 | ! 000! | Ctrl Q | CONTROL Q | 81 | !0! 000! | Q | UPPERCASE Q |
| 18 | ! 00!0 | Ctrl R | CONTROL R | 82 | !0! 00!0 | R | UPPERCASE R |
| 19 | ! 00!! | Ctrl S | CONTROL S | 83 | !0! 00!! | S | UPPERCASE S |
| 20 | ! 0!00 | Ctrl T | CONTROL T | 84 | !0! 0!00 | T | UPPERCASE T |
| 21 | ! 0!0! | Ctrl U | CONTROL U | 85 | !0! 0!0! | U | UPPERCASE U |
| 22 | ! 0!!0 | Ctrl V | CONTROL V | 86 | !0! 0!!0 | V | UPPERCASE V |
| 23 | ! 0!!! | Ctrl W | CONTROL W | 87 | !0! 0!!! | W | UPPERCASE W |
| 24 | ! !000 | Ctrl X | CONTROL X | 88 | !0! !000 | X | UPPERCASE X |
| 25 | ! !00! | Ctrl Y | CONTROL Y | 89 | !0! !00! | Y | UPPERCASE Y |
| 26 | ! !0!0 | <EOF> | CONTROL Z | 90 | !0! !0!0 | Z | UPPERCASE Z |
| 27 | ! !0!! | <ESC> | ESCAPE | 91 | !0! !0!! | [ | LEFT BRACKET |
| 28 | ! !!00 | Ctrl \ | CONTROL BACKSLASH | 92 | !0! !!00 | \ | BACKSLASH |
| 29 | ! !!0! | Ctrl ] | CONTROL RGHT BRCKT | 93 | !0! !!0! | ] | RIGHT BRACKET |
| 30 | ! !!!0 | Ctrl 6 | CONTROL SIX | 94 | !0! !!!0 | ^ | CARET |
| 31 | ! !!!! | Ctrl — | CONTROL DASH | 95 | !0! !!!! | _ | UNDERLINE |
| 32 | !0 0000 | <SP> | SPACE | 96 | !!0 0000 | ` | SNGL BACKQUOTE |
| 33 | !0 000! | ! | EXCLAMATION MARK | 97 | !!0 000! | a | LOWERCASE A |
| 34 | !0 00!0 | " | DOUBLE QUOTE | 98 | !!0 00!0 | b | LOWERCASE B |
| 35 | !0 00!! | # | NUMBER SIGN | 99 | !!0 00!! | c | LOWERCASE C |
| 36 | !0 0!00 | $ | DOLLAR SIGN | 100 | !!0 0!00 | d | LOWERCASE D |
| 37 | !0 0!0! | % | PERCENT / MODULUS SIGN | 101 | !!0 0!0! | e | LOWERCASE E |
| 38 | !0 0!!0 | & | AMPERSAND | 102 | !!0 0!!0 | f | LOWERCASE F |
| 39 | !0 0!!! | ' | SINGLE QUOTE | 103 | !!0 0!!! | g | LOWERCASE G |
| 40 | !0 !000 | ( | LEFT PARENTHESIS | 104 | !!0 !000 | h | LOWERCASE H |
| 41 | !0 !00! | ) | RIGHT PARENTHESIS | 105 | !!0 !00! | i | LOWERCASE I |
| 42 | !0 !0!0 | * | STAR / MULTIPLY SIGN | 106 | !!0 !0!0 | j | LOWERCASE J |
| 43 | !0 !0!! | + | PLUS SIGN | 107 | !!0 !0!! | k | LOWERCASE K |
| 44 | !0 !!00 | , | COMMA | 108 | !!0 !!00 | l | LOWERCASE L |
| 45 | !0 !!0! | — | DASH / MINUS SIGN | 109 | !!0 !!0! | m | LOWERCASE M |
| 46 | !0 !!!0 | . | PERIOD | 110 | !!0 !!!0 | n | LOWERCASE N |
| 47 | !0 !!!! | / | SLASH / DIVIDE SIGN | 111 | !!0 !!!! | o | LOWERCASE O |
| 48 | !! 0000 | 0 | ZERO | 112 | !!! 0000 | p | LOWERCASE P |
| 49 | !! 000! | 1 | ONE | 113 | !!! 000! | q | LOWERCASE Q |
| 50 | !! 00!0 | 2 | TWO | 114 | !!! 00!0 | r | LOWERCASE R |
| 51 | !! 00!! | 3 | THREE | 115 | !!! 00!! | s | LOWERCASE S |
| 52 | !! 0!00 | 4 | FOUR | 116 | !!! 0!00 | t | LOWERCASE T |
| 53 | !! 0!0! | 5 | FIVE | 117 | !!! 0!0! | u | LOWERCASE U |
| 54 | !! 0!!0 | 6 | SIX | 118 | !!! 0!!0 | v | LOWERCASE V |
| 55 | !! 0!!! | 7 | SEVEN | 119 | !!! 0!!! | w | LOWERCASE W |
| 56 | !! !000 | 8 | EIGHT | 120 | !!! !000 | x | LOWERCASE X |
| 57 | !! !00! | 9 | NINE | 121 | !!! !00! | y | LOWERCASE Y |
| 58 | !! !0!0 | : | COLON | 122 | !!! !0!0 | z | LOWERCASE Z |
| 59 | !! !0!! | ; | SEMI-COLON | 123 | !!! !0!! | { | LEFT BRACE |
| 60 | !! !!00 | < | LESS THAN SIGN | 124 | !!! !!00 | | | VERTICAL BAR |
| 61 | !! !!0! | = | EQUAL SIGN | 125 | !!! !!0! | } | RIGHT BRACE |
| 62 | !! !!!0 | > | GREATER THAN SIGN | 126 | !!! !!!0 | ~ | TILDE |
| 63 | !! !!!! | ? | QUESTION MARK | 127 | !!! !!!! | FF | |

TABLE 2

For a BASE 3 or trinary system (we shall represent our BASE 3 characters as '!', '+', '0') we will have one switch for each of the trinary characters plus one SEND switch for a total of four switches.

| DEC BASE 10 | TRINARY BASE 3 | ASCII BASE 128 | SYMBOL DESCRIPTION | DECIMAL BASE 10 | TRINARY BASE 3 | ASCII BASE 128 | SYMBOL DESCRIPTION |
|---|---|---|---|---|---|---|---|
| 0 |  | NULL | NULL | 64 | !00! | @ | AT SIGN |
| 1 | ! | Ctrl A | CONTROL A | 65 | !00+ | A | UPPERCASE A |
| 2 | + | Ctrl B | CONTROL B | 66 | !000 | B | UPPERCASE B |
| 3 | 0 | Ctrl C | CONTROL C | 67 | +!!! | C | UPPERCASE C |
| 4 | !! | Ctrl D | CONTROL D | 68 | +!!+ | D | UPPERCASE D |
| 5 | !+ | Ctrl E | CONTROL E | 69 | +!!0 | E | UPPERCASE E |
| 6 | !0 | Ctrl F | CONTROL F | 70 | +!+! | F | UPPERCASE F |
| 7 | +! | <BELL> | CONTROL G | 71 | +!++ | G | UPPERCASE G |
| 8 | ++ | <BS> | BACKSPACE | 72 | +!+0 | H | UPPERCASE H |
| 9 | +0 | <HTAB> | HORIZONTAL TAB | 73 | +!0! | I | UPPERCASE I |
| 10 | 0! | <LF> | LINEFEED | 74 | +!0+ | J | UPPERCASE J |
| 11 | 0+ | <VTAB> | VERTICAL TAB | 75 | +!00 | K | UPPERCASE K |
| 12 | 00 | <FF> | FORMFEED | 76 | ++!! | L | UPPERCASE L |
| 13 | !!! | <CR> | CARRIAGE RETURN | 77 | ++!+ | M | UPPERCASE M |
| 14 | !!+ | Ctrl N | CONTROL N | 78 | ++!0 | N | UPPERCASE N |
| 15 | !!0 | Ctrl O | CONTROL O | 79 | +++! | O | UPPERCASE O |
| 16 | !+! | Ctrl P | CONTROL P | 80 | ++++ | P | UPPERCASE P |
| 17 | !++ | Ctrl Q | CONTROL Q | 81 | +++0 | Q | UPPERCASE Q |
| 18 | !+0 | Ctrl R | CONTROL R | 82 | ++0! | R | UPPERCASE R |
| 19 | !0! | Ctrl S | CONTROL S | 83 | ++0+ | S | UPPERCASE S |
| 20 | !0+ | Ctrl T | CONTROL T | 84 | ++00 | T | UPPERCASE T |
| 21 | !00 | Ctrl U | CONTROL U | 85 | +0!! | U | UPPERCASE U |
| 22 | +!! | Ctrl V | CONTROL V | 86 | +0!+ | V | UPPERCASE V |
| 23 | +!+ | Ctrl W | CONTROL W | 87 | +0!0 | W | UPPERCASE W |
| 24 | +!0 | Ctrl X | CONTROL X | 88 | +0+! | X | UPPERCASE X |
| 25 | ++! | Ctrl Y | CONTROL Y | 89 | +0++ | Y | UPPERCASE Y |
| 26 | +++ | <EOF> | CONTROL Z | 90 | +0+0 | Z | UPPERCASE Z |
| 27 | ++0 | <ESC> | ESCAPE | 91 | +00! | [ | LEFT BRACKET |
| 28 | +0! | Ctrl \ | CONTROL BACKSLASH | 92 | +00+ | \ | BACKSLASH |
| 29 | +0+ | Ctrl ] | CONTROL RGHT BRCKT | 93 | +000 | ] | RIGHT BRACKET |
| 30 | +00 | Ctrl 6 | CONTROL SIX | 94 | 0!!! | ^ | CARET |
| 31 | 0!! | Ctrl — | CONTROL DASH | 95 | 0!!+ | _ | UNDERLINE |
| 32 | 0!+ | <SP> | SPACE | 96 | 0!!0 | ` | SINGLE BACKQUOTE |
| 33 | 0!0 | ! | EXCLAMATION MARK | 97 | 0!+! | a | LOWERCASE A |
| 34 | 0+! | " | DOUBLE QUOTE | 98 | 0!++ | b | LOWERCASE B |
| 35 | 0++ | # | NUMBER SIGN | 99 | 0!+0 | c | LOWERCASE C |
| 36 | 0+0 | $ | DOLLAR SIGN | 100 | 0!0! | d | LOWERCASE D |
| 37 | 00! | % | PERCENT / MODULUS SIGN | 101 | 0!0+ | e | LOWERCASE E |
| 38 | 00+ | & | AMPERSAND | 102 | 0!00 | f | LOWERCASE F |
| 39 | 000 | ' | SINGLE QUOTE | 103 | 0+!! | g | LOWERCASE G |
| 40 | !!!! | ( | LEFT PARENTHESIS | 104 | 0+!+ | h | LOWERCASE H |
| 41 | !!!+ | ) | RIGHT PARENTHESIS | 105 | 0+!0 | i | LOWERCASE I |
| 42 | !!!0 | * | STAR / MULTIPLY SIGN | 106 | 0++! | j | LOWERCASE J |
| 43 | !!+! | + | PLUS SIGN | 107 | 0+++ | k | LOWERCASE K |
| 44 | !!++ | , | COMMA | 108 | 0++0 | l | LOWERCASE L |
| 45 | !!+0 | — | DASH / MINUS SIGN | 109 | 0+0! | m | LOWERCASE M |
| 46 | !!0! | . | PERIOD | 110 | 0+0+ | n | LOWERCASE N |
| 47 | !!0+ | / | SLASH / DIVIDE SIGN | 111 | 0+00 | o | LOWERCASE O |
| 48 | !!00 | 0 | ZERO | 112 | 00!! | p | LOWERCASE P |
| 49 | !+!! | 1 | ONE | 113 | 00!+ | q | LOWERCASE Q |
| 50 | !+!+ | 2 | TWO | 114 | 00!0 | r | LOWERCASE R |
| 51 | !+!0 | 3 | THREE | 115 | 00+! | s | LOWERCASE S |
| 52 | !++! | 4 | FOUR | 116 | 00++ | t | LOWERCASE T |
| 53 | !+++ | 5 | FIVE | 117 | 00+0 | u | LOWERCASE U |
| 54 | !++0 | 6 | SIX | 118 | 000! | v | LOWERCASE V |
| 55 | !+0! | 7 | SEVEN | 119 | 000+ | w | LOWERCASE W |
| 56 | !+0+ | 8 | EIGHT | 120 | 0000 | x | LOWERCASE X |
| 57 | !+00 | 9 | NINE | 121 | !!!!! | y | LOWERCASE Y |
| 58 | !0!! | : | COLON | 122 | !!!+ | z | LOWERCASE Z |
| 59 | !0!+ | ; | SEMI-COLON | 123 | !!!0 | { | LEFT BRACE |
| 60 | !0!0 | < | LESS THAN SIGN | 124 | !!!+! | | | VERTICAL BAR |
| 61 | !0+! | = | EQUAL SIGN | 125 | !!!++ | } | RIGHT BRACE |
| 62 | !0++ | > | GREATER THAN SIGN | 126 | !!!+0 | ~ | TILDE |
| 63 | !0+0 | ? | QUESTION MARK | 127 | !!!0! | FF |  |

TABLE 3

For a BASE 4 or quadrinary system (we shall represent our BASE 4 characters as '!', '+', '*', '0') we will have one switch for each of the quadrinary characters plus one SEND switch for a total of five switches.

| DEC BASE 10 | QUADRA BASE 4 | ASCII BASE 128 | SYMBOL DESCRIPTION | DECIMAL BASE 10 | QUADRA BASE 4 | ASCII BASE 128 | SYMBOL DESCRIPTION |
|---|---|---|---|---|---|---|---|
| 0 |  | NULL | NULL | 64 | **0 | @ | AT SIGN |
| 1 | ! | Ctrl A | CONTROL A | 65 | *0! | A | UPPERCASE A |
| 2 | + | Ctrl B | CONTROL B | 66 | *0+ | B | UPPERCASE B |
| 3 | * | Ctrl C | CONTROL C | 67 | *0* | C | UPPERCASE C |
| 4 | 0 | Ctrl D | CONTROL D | 68 | *00 | D | UPPERCASE D |
| 5 | !! | Ctrl E | CONTROL E | 69 | 0!! | E | UPPERCASE E |
| 6 | !+ | Ctrl F | CONTROL F | 70 | 0!+ | F | UPPERCASE F |
| 7 | !* | <BELL> | CONTROL G | 71 | 0!* | G | UPPERCASE G |
| 8 | !0 | <BS> | BACKSPACE | 72 | 0!0 | H | UPPERCASE H |
| 9 | +! | <HTAB> | HORIZONTAL TAB | 73 | 0+! | I | UPPERCASE I |
| 10 | ++ | <LF> | LINEFEED | 74 | 0+! | J | UPPERCASE J |
| 11 | +* | <VTAB> | VERTICAL TAB | 75 | 0+* | K | UPPERCASE K |
| 12 | +0 | <FF> | FORMFEED | 76 | 0+0 | L | UPPERCASE L |
| 13 | *! | <CR> | CARRIAGE RETURN | 77 | 0*! | M | UPPERCASE M |
| 14 | *+ | Ctrl N | CONTROL N | 78 | 0*+ | N | UPPERCASE N |
| 15 | ** | Ctrl O | CONTROL O | 79 | 0** | O | UPPERCASE O |
| 16 | *0 | Ctrl P | CONTROL P | 80 | 0*0 | P | UPPERCASE P |
| 17 | 0! | Ctrl Q | CONTROL Q | 81 | 00! | Q | UPPERCASE Q |
| 18 | 0+ | Ctrl R | CONTROL R | 82 | 00+ | R | UPPERCASE R |
| 19 | 0* | Ctrl S | CONTROL S | 83 | 00* | S | UPPERCASE S |
| 20 | 00 | Ctrl T | CONTROL T | 84 | 000 | T | UPPERCASE T |
| 21 | !!! | Ctrl U | CONTROL U | 85 | !!!! | U | UPPERCASE U |
| 22 | !!+ | Ctrl V | CONTROL V | 86 | !!!+ | V | UPPERCASE V |
| 23 | !!* | Ctrl W | CONTROL W | 87 | !!!* | W | UPPERCASE W |
| 24 | !!0 | Ctrl X | CONTROL X | 88 | !!!0 | X | UPPERCASE X |
| 25 | !+! | Ctrl Y | CONTROL Y | 89 | !!+! | Y | UPPERCASE Y |
| 26 | !++ | <EOF> | CONTROL Z | 90 | !!++ | Z | UPPERCASE Z |
| 27 | !+* | <ESC> | ESCAPE | 91 | !!+* | [ | LEFT BRACKET |
| 28 | !+0 | Ctrl | CONTROL BACKSLASH | 92 | !!+0 | \ | BACKSLASH |
| 29 | !*! | Ctrl ] | CONTROL RGHT BRCKT | 93 | !!*! | ] | RIGHT BRACKET |
| 30 | !*+ | Ctrl 6 | CONTROL SIX | 94 | !!*+ | ^ | CARET |
| 31 | !** | Ctrl — | CONTROL DASH | 95 | !!** | _ | UNDERLINE |
| 32 | !*0 | <SP> | SPACE | 96 | !!*0 | ` | SINGLE BACKQUOTE |
| 33 | !0! | ! | EXCLAMATION MARK | 97 | !!0! | a | LOWERCASE A |
| 34 | !0+ | " | DOUBLE QUOTE | 98 | !!0+ | b | LOWERCASE B |
| 35 | !0* | # | NUMBER SIGN | 99 | !!0* | c | LOWERCASE C |
| 36 | !00 | $ | DOLLAR SIGN | 100 | !!00 | d | LOWERCASE D |
| 37 | +!! | % | PERCENT / MODULUS SIGN | 101 | !+!! | e | LOWERCASE E |
| 38 | +!+ | & | AMPERSAND | 102 | !+!+ | f | LOWERCASE F |
| 39 | +!* | ' | SINGLE QUOTE | 103 | !+!* | g | LOWERCASE G |
| 40 | +!0 | ( | LEFT PARENTHESIS | 104 | !+!0 | h | LOWERCASE H |
| 41 | ++! | ) | RIGHT PARENTHESIS | 105 | !++! | i | LOWERCASE I |
| 42 | +++ | * | STAR / MULTIPLY SIGN | 106 | !+++ | j | LOWERCASE J |
| 43 | ++* | + | PLUS SIGN | 107 | !++* | k | LOWERCASE K |
| 44 | ++0 | , | COMMA | 108 | !++0 | l | LOWERCASE L |
| 45 | +*! | — | DASH / MINUS SIGN | 109 | !+*! | m | LOWERCASE M |
| 46 | +*+ | . | PERIOD | 110 | !+*+ | n | LOWERCASE N |
| 47 | +** | / | SLASH / DIVIDE SIGN | 111 | !+** | o | LOWERCASE O |
| 48 | +*0 | 0 | ZERO | 112 | !+*0 | p | LOWERCASE P |
| 49 | +0! | 1 | ONE | 113 | !+0! | q | LOWERCASE Q |
| 50 | +0+ | 2 | TWO | 114 | !+0+ | r | LOWERCASE R |
| 51 | +0* | 3 | THREE | 115 | !+0* | s | LOWERCASE S |
| 52 | +00 | 4 | FOUR | 116 | !+00 | t | LOWERCASE T |
| 53 | *!! | 5 | FIVE | 117 | !*!! | u | LOWERCASE U |
| 54 | *!+ | 6 | SIX | 118 | !*!+ | v | LOWERCASE V |
| 55 | *!* | 7 | SEVEN | 119 | !*!* | w | LOWERCASE W |
| 56 | *!0 | 8 | EIGHT | 120 | !*!0 | x | LOWERCASE X |
| 57 | *+! | 9 | NINE | 121 | !*+! | y | LOWERCASE Y |
| 58 | *++ | : | COLON | 122 | !*++ | z | LOWERCASE Z |
| 59 | *+* | ; | SEMI-COLON | 123 | !*+* | { | LEFT BRACE |
| 60 | *+0 | < | LESS THAN SIGN | 124 | !*+0 | \| | VERTICAL BAR |
| 61 | ! | = | EQUAL SIGN | 125 | !! | } | RIGHT BRACE |
| 62 | + | > | GREATER THAN SIGN | 126 | !+ | ~ | TILDE |
| 63 | *** | ? | QUESTION MARK | 127 | !*** | FF |  |

TABLE 4

For a BASE 5 or quinary system (we shall represent our BASE 5 characters as '!', '+', '*', '#', '0') we will have one switch for each of the quinary characters plus one SEND switch for a total of six switches.

| DEC BASE 10 | QUINT BASE 5 | ASCII BASE 128 | SYMBOL DESCRIPTION | DECIMAL BASE 10 | QUINT BASE 5 | ASCII BASE 128 | SYMBOL DESCRIPTION |
|---|---|---|---|---|---|---|---|
| 0 |  | NULL | NULL | 64 | ++# | @ | AT SIGN |
| 1 | ! | Ctrl A | CONTROL A | 65 | ++0 | A | UPPERCASE A |
| 2 | + | Ctrl B | CONTROL B | 66 | +*! | B | UPPERCASE B |
| 3 | * | Ctrl C | CONTROL C | 67 | +*+ | C | UPPERCASE C |
| 4 | # | Ctrl D | CONTROL D | 68 | +** | D | UPPERCASE D |
| 5 | 0 | Ctrl E | CONTROL E | 69 | +*# | E | UPPERCASE E |
| 6 | !! | Ctrl F | CONTROL F | 70 | +*0 | F | UPPERCASE F |
| 7 | !+ | <BELL> | CONTROL G | 71 | +#! | G | UPPERCASE G |
| 8 | !* | <BS> | BACKSPACE | 72 | +#+ | H | UPPERCASE H |
| 9 | !# | <HTAB> | HORIZONTAL TAB | 73 | +#* | I | UPPERCASE I |
| 10 | !0 | <LF> | LINEFEED | 74 | +## | J | UPPERCASE J |
| 11 | +! | <VTAB> | VERTICAL TAB | 75 | +#0 | K | UPPERCASE K |
| 12 | ++ | <FF> | FORMFEED | 76 | +0! | L | UPPERCASE L |
| 13 | +* | <CR> | CARRIAGE RETURN | 77 | +0+ | M | UPPERCASE M |
| 14 | +# | Ctrl N | CONTROL N | 78 | +0* | N | UPPERCASE N |
| 15 | +0 | Ctrl O | CONTROL O | 79 | +0# | O | UPPERCASE O |
| 16 | *! | Ctrl P | CONTROL P | 80 | +00 | P | UPPERCASE P |
| 17 | *+ | Ctrl Q | CONTROL Q | 81 | *!! | Q | UPPERCASE Q |
| 18 | ** | Ctrl R | CONTROL R | 82 | *!+ | R | UPPERCASE R |
| 19 | *# | Ctrl S | CONTROL S | 83 | *!* | S | UPPERCASE S |
| 20 | *0 | Ctrl T | CONTROL T | 84 | *!# | T | UPPERCASE T |
| 21 | #! | Ctrl U | CONTROL U | 85 | *!0 | U | UPPERCASE U |
| 22 | #+ | Ctrl V | CONTROL V | 86 | *+! | V | UPPERCASE V |
| 23 | #* | Ctrl W | CONTROL W | 87 | *++ | W | UPPERCASE W |
| 24 | ## | Ctrl X | CONTROL X | 88 | *+* | X | UPPERCASE X |
| 25 | #0 | Ctrl Y | CONTROL Y | 89 | *+# | Y | UPPERCASE Y |
| 26 | 0! | <EOF> | CONTROL Z | 90 | *+0 | Z | UPPERCASE Z |
| 27 | 0+ | <ESC> | ESCAPE | 91 | **! | [ | LEFT BRACKET |
| 28 | 0* | Ctrl | CONTROL BACKSLASH | 92 | **+ |  | BACKSLASH |
| 29 | 0# | Ctrl ] | CONTROL RGHT BRCKT | 93 | *** | ] | RIGHT BRACKET |
| 30 | 00 | Ctrl 6 | CONTROL SIX | 94 | **# |  | CARET |
| 31 | !!! | Ctrl — | CONTROL DASH | 95 | **0 | _ | UNDERLINE |
| 32 | !!+ | <SP> | SPACE | 96 | *#! |  | SINGLE BACKQUOTE |
| 33 | !!* | ! | EXCLAMATION MARK | 97 | *#+ | a | LOWERCASE A |
| 34 | !!# | " | DOUBLE QUOTE | 98 | *#* | b | LOWERCASE B |
| 35 | !!0 | # | NUMBER SIGN | 99 | *## | c | LOWERCASE C |
| 36 | !+! | $ | DOLLAR SIGN | 100 | *#0 | d | LOWERCASE D |
| 37 | !++ | % | PERCENT / MODULUS SIGN | 101 | *0! | e | LOWERCASE E |
| 38 | !+* | & | AMPERSAND | 102 | *0+ | f | LOWERCASE F |
| 39 | !+# | ' | SINGLE QUOTE | 103 | *0* | g | LOWERCASE G |
| 40 | !+0 | ( | LEFT PARENTHESIS | 104 | *0# | h | LOWERCASE H |
| 41 | !*! | ) | RIGHT PARENTHESIS | 105 | *00 | i | LOWERCASE I |
| 42 | !*+ | * | STAR / MULTIPLY SIGN | 106 | #!! | j | LOWERCASE J |
| 43 | !** | + | PLUS SIGN | 107 | #!+ | k | LOWERCASE K |
| 44 | !*# | , | COMMA | 108 | #!* | l | LOWERCASE L |
| 45 | !*0 | — | DASH / MINUS SIGN | 109 | #!# | m | LOWERCASE M |
| 46 | !#! | . | PERIOD | 110 | #!0 | n | LOWERCASE N |
| 47 | !#+ | / | SLASH / DIVIDE SIGN | 111 | #+! | o | LOWERCASE O |
| 48 | !#* | 0 | ZERO | 112 | #++ | p | LOWERCASE P |
| 49 | !## | 1 | ONE | 113 | #+* | q | LOWERCASE Q |
| 50 | !#0 | 2 | TWO | 114 | #+# | r | LOWERCASE R |
| 51 | !0! | 3 | THREE | 115 | #+0 | s | LOWERCASE S |
| 52 | !0+ | 4 | FOUR | 116 | #*! | t | LOWERCASE T |
| 53 | !0* | 5 | FIVE | 117 | #*+ | u | LOWERCASE U |
| 54 | !0# | 6 | SIX | 118 | #** | v | LOWERCASE V |
| 55 | !00 | 7 | SEVEN | 119 | #*# | w | LOWERCASE W |
| 56 | +!! | 8 | EIGHT | 120 | #*0 | x | LOWERCASE X |
| 57 | +!+ | 9 | NINE | 121 | ##! | y | LOWERCASE Y |
| 58 | +!* | : | COLON | 122 | ##+ | z | LOWERCASE Z |
| 59 | +!# | ; | SEMI-COLON | 123 | ##* | { | LEFT BRACE |
| 60 | +!0 | < | LESS THAN SIGN | 124 | ### | ! | VERTICAL BAR |
| 61 | ++! | = | EQUAL SIGN | 125 | ##0 | } | RIGHT BRACE |
| 62 | +++ | > | GREATER THAN SIGN | 126 | #0! | ~ | TILDE |
| 63 | ++* | ? | QUESTION MARK | 127 | #0+ | FF |  |

TABLE 5

For a BASE 6 or hexal system (we shall represent our BASE 6 characters as '!', '+', '*', '#', '%', '0') we will have one switch for each of the hexal characters plus one SEND switch for a total of seven switches.

| DEC BASE 10 | HEXAL BASE 6 | ASCII BASE 128 | SYMBOL DESCRIPTION | DECIMAL BASE 10 | HEXAL BASE 6 | ASCII BASE 128 | SYMBOL DESCRIPTION |
|---|---|---|---|---|---|---|---|
| 0 | | NULL | NULL | 64 | !## | @ | AT SIGN |
| 1 | ! | Ctrl A | CONTROL A | 65 | !#% | A | UPPERCASE A |
| 2 | + | Ctrl B | CONTROL B | 66 | !#0 | B | UPPERCASE B |
| 3 | * | Ctrl C | CONTROL C | 67 | !%! | C | UPPERCASE C |
| 4 | # | Ctrl D | CONTROL D | 68 | !%+ | D | UPPERCASE D |
| 5 | % | Ctrl E | CONTROL E | 69 | !%* | E | UPPERCASE E |
| 6 | 0 | Ctrl F | CONTROL F | 70 | !%# | F | UPPERCASE F |
| 7 | !! | <BELL> | CONTROL G | 71 | !%% | G | UPPERCASE G |
| 8 | !+ | <BS> | BACKSPACE | 72 | !%0 | H | UPPERCASE H |
| 9 | !* | <HTAB> | HORIZONTAL TAB | 73 | !0! | I | UPPERCASE I |
| 10 | !# | <LF> | LINEFEED | 74 | !0+ | J | UPPERCASE J |
| 11 | ++ | <VTAB> | VERTICAL TAB | 75 | !0* | K | UPPERCASE K |
| 12 | !0 | <FF> | FORMFEED | 76 | !0# | L | UPPERCASE L |
| 13 | +! | <CR> | CARRIAGE RETURN | 77 | !0% | M | UPPERCASE M |
| 14 | ++ | Ctrl N | CONTROL N | 78 | !00 | N | UPPERCASE N |
| 15 | +* | Ctrl O | CONTROL O | 79 | +!! | O | UPPERCASE O |
| 16 | +# | Ctrl P | CONTROL P | 80 | +!+ | P | UPPERCASE P |
| 17 | +% | Ctrl Q | CONTROL Q | 81 | +!* | Q | UPPERCASE Q |
| 18 | +0 | Ctrl R | CONTROL R | 82 | +!# | R | UPPERCASE R |
| 19 | *! | Ctrl S | CONTROL S | 83 | +!% | S | UPPERCASE S |
| 20 | *+ | Ctrl T | CONTROL T | 84 | +!0 | T | UPPERCASE T |
| 21 | ** | Ctrl U | CONTROL U | 85 | ++! | U | UPPERCASE U |
| 22 | *# | Ctrl V | CONTROL V | 86 | +++ | V | UPPERCASE V |
| 23 | *% | Ctrl W | CONTROL W | 87 | ++* | W | UPPERCASE W |
| 24 | *0 | Ctrl X | CONTROL X | 88 | ++# | X | UPPERCASE X |
| 25 | #! | Ctrl Y | CONTROL Y | 89 | ++% | Y | UPPERCASE Y |
| 26 | #+ | <EOF> | CONTROL Z | 90 | ++0 | Z | UPPERCASE Z |
| 27 | #* | <ESC> | ESCAPE | 91 | +*! | [ | LEFT BRACKET |
| 28 | ## | Ctrl | CONTROL BACKSLASH | 92 | +*+ | \ | BACKSLASH |
| 29 | #% | Ctrl ] | CONTROL RGHT BRCKT | 93 | +** | ] | RIGHT BRACKET |
| 30 | #0 | Ctrl 6 | CONTROL SIX | 94 | +*# | ^ | CARET |
| 31 | %! | Ctrl — | CONTROL DASH | 95 | +*% | _ | UNDERLINE |
| 32 | %+ | <SP> | SPACE | 96 | +*0 | ` | SINGLE BACKQUOTE |
| 33 | %* | ! | EXCLAMATION MARK | 97 | +#! | a | LOWERCASE A |
| 34 | %# | " | DOUBLE QUOTE | 98 | +#+ | b | LOWERCASE B |
| 35 | %% | # | NUMBER SIGN | 99 | +#* | c | LOWERCASE C |
| 36 | %0 | $ | DOLLAR SIGN | 100 | +## | d | LOWERCASE D |
| 37 | 0! | % | PERCENT / MODULUS SIGN | 101 | +#% | e | LOWERCASE E |
| 38 | 0+ | & | AMPERSAND | 102 | +#0 | f | LOWERCASE F |
| 39 | 0* | ' | SINGLE QUOTE | 103 | +%! | g | LOWERCASE G |
| 40 | 0# | ( | LEFT PARENTHESIS | 104 | +%+ | h | LOWERCASE H |
| 41 | 0% | ) | RIGHT PARENTHESIS | 105 | +%* | i | LOWERCASE I |
| 42 | 00 | * | STAR / MULTIPLY SIGN | 106 | +%# | j | LOWERCASE J |
| 43 | !!! | + | PLUS SIGN | 107 | +%% | k | LOWERCASE K |
| 44 | !!+ | , | COMMA | 108 | +%0 | l | LOWERCASE L |
| 45 | !!* | — | DASH / MINUS SIGN | 109 | +0! | m | LOWERCASE M |
| 46 | !!# | . | PERIOD | 110 | +0+ | n | LOWERCASE N |
| 47 | !!% | / | SLASH / DIVIDE SIGN | 111 | +0* | o | LOWERCASE O |
| 48 | !!0 | 0 | ZERO | 112 | +0# | p | LOWERCASE P |
| 49 | !+! | 1 | ONE | 113 | +0% | q | LOWERCASE Q |
| 50 | !++ | 2 | TWO | 114 | +00 | r | LOWERCASE R |
| 51 | !+* | 3 | THREE | 115 | *!! | s | LOWERCASE S |
| 52 | !+# | 4 | FOUR | 116 | *!+ | t | LOWERCASE T |
| 53 | !+% | 5 | FIVE | 117 | *!* | u | LOWERCASE U |
| 54 | !+0 | 6 | SIX | 118 | *!# | v | LOWERCASE V |
| 55 | !*! | 7 | SEVEN | 119 | *!% | w | LOWERCASE W |
| 56 | !*+ | 8 | EIGHT | 120 | *!0 | x | LOWERCASE X |
| 57 | !** | 9 | NINE | 121 | *+! | y | LOWERCASE Y |
| 58 | !*# | : | COLON | 122 | *++ | z | LOWERCASE Z |
| 59 | !*% | ; | SEMI-COLON | 123 | *+* | { | LEFT BRACE |
| 60 | !*0 | < | LESS THAN SIGN | 124 | *+# | \| | VERTICAL BAR |
| 61 | !#! | = | EQUAL SIGN | 125 | *+% | } | RIGHT BRACE |
| 62 | !#+ | > | GREATER THAN SIGN | 126 | *+0 | ~ | TILDE |
| 63 | !#* | ? | QUESTION MARK | 127 | **! | FF | |

TABLE 6

For a BASE 7 or heptal system (we shall represent our BASE 7 characters as '!', '+', '*', '#', '%', '=', '0')) we will have one switch for each of the heptal characters plus one SEND switch for a total of eight switches.

| DEC BASE 10 | HEPTAL BASE 7 | ASCII BASE 128 | SYMBOL DESCRIPTION | DECIMAL BASE 10 | HEPTAL BASE 7 | ASCII BASE 128 | SYMBOL DESCRIPTION |
|---|---|---|---|---|---|---|---|
| 0 |  | NULL | NULL | 64 | !+! | @ | AT SIGN |
| 1 | ! | Ctrl A | CONTROL A | 65 | !++ | A | UPPERCASE A |
| 2 | + | Ctrl B | CONTROL B | 66 | !+* | B | UPPERCASE B |
| 3 | * | Ctrl C | CONTROL C | 67 | !+# | C | UPPERCASE C |
| 4 | # | Ctrl D | CONTROL D | 68 | !+% | D | UPPERCASE D |
| 5 | % | Ctrl E | CONTROL E | 69 | !+= | E | UPPERCASE E |
| 6 | = | Ctrl F | CONTROL F | 70 | !+0 | F | UPPERCASE F |
| 7 | 0 | <BELL> | CONTROL G | 71 | !*! | G | UPPERCASE G |
| 8 | !! | <BS> | BACKSPACE | 72 | !*+ | H | UPPERCASE H |
| 9 | !+ | <HTAB> | HORIZONTAL TAB | 73 | !** | I | UPPERCASE I |
| 10 | !* | <LF> | LINEFEED | 74 | !*# | J | UPPERCASE J |
| 11 | !# | <VTAB> | VERTICAL TAB | 75 | !*% | K | UPPERCASE K |
| 12 | !% | <FF> | FORMFEED | 76 | !*= | L | UPPERCASE L |
| 13 | != | <CR> | CARRIAGE RETURN | 77 | !*0 | M | UPPERCASE M |
| 14 | !0 | Ctrl N | CONTROL N | 78 | !#! | N | UPPERCASE N |
| 15 | +! | Ctrl O | CONTROL O | 79 | !#+ | O | UPPERCASE O |
| 16 | ++ | Ctrl P | CONTROL P | 80 | !#* | P | UPPERCASE P |
| 17 | +* | Ctrl Q | CONTROL Q | 81 | !## | Q | UPPERCASE Q |
| 18 | +# | Ctrl R | CONTROL R | 82 | !#% | R | UPPERCASE R |
| 19 | +% | Ctrl S | CONTROL S | 83 | !#= | S | UPPERCASE S |
| 20 | *= | Ctrl T | CONTROL T | 84 | !#0 | T | UPPERCASE T |
| 21 | +0 | Ctrl U | CONTROL U | 85 | !%! | U | UPPERCASE U |
| 22 | *! | Ctrl V | CONTROL V | 86 | !%+ | V | UPPERCASE V |
| 23 | *+ | Ctrl W | CONTROL W | 87 | !%* | W | UPPERCASE W |
| 24 | ** | Ctrl X | CONTROL X | 88 | !%# | X | UPPERCASE X |
| 25 | *# | Ctrl Y | CONTROL Y | 89 | !%% | Y | UPPERCASE Y |
| 26 | *% | <EOF> | CONTROL Z | 90 | !%= | Z | UPPERCASE Z |
| 27 | *= | <ESC> | ESCAPE | 91 | !%0 | [ | LEFT BRACKET |
| 28 | *0 | Ctrl | CONTROL BACKSLASH | 92 | !=! |  | BACKSLASH |
| 29 | #! | Ctrl ] | CONTROL RGHT BRCKT | 93 | !=+ | ] | RIGHT BRACKET |
| 30 | #+ | Ctrl 6 | CONTROL SIX | 94 | !=* | ^ | CARET |
| 31 | #* | Ctrl — | CONTROL DASH | 95 | !=# | _ | UNDERLINE |
| 32 | ## | <SP> | SPACE | 96 | !=% | ` | SINGLE BACKQUOTE |
| 33 | #% | ! | EXCLAMATION MARK | 97 | !== | a | LOWERCASE A |
| 34 | #= | " | DOUBLE QUOTE | 98 | !=0 | b | LOWERCASE B |
| 35 | #0 | # | NUMBER SIGN | 99 | !0! | c | LOWERCASE C |
| 36 | %! | $ | DOLLAR SIGN | 100 | !0+ | d | LOWERCASE D |
| 37 | %+ | % | PERCENT / MODULUS SIGN | 101 | !0* | e | LOWERCASE E |
| 38 | %* | & | AMPERSAND | 102 | !0# | f | LOWERCASE F |
| 39 | %# | ' | SINGLE QUOTE | 103 | !0% | g | LOWERCASE G |
| 40 | %% | ( | LEFT PARENTHESIS | 104 | !0= | h | LOWERCASE H |
| 41 | %= | ) | RIGHT PARENTHESIS | 105 | !00 | i | LOWERCASE I |
| 42 | %0 | * | STAR / MULTIPLY SIGN | 106 | +!! | j | LOWERCASE J |
| 43 | =! | + | PLUS SIGN | 107 | +!+ | k | LOWERCASE K |
| 44 | =+ | , | COMMA | 108 | +!* | l | LOWERCASE L |
| 45 | =* | — | DASH / MINUS SIGN | 109 | +!# | m | LOWERCASE M |
| 46 | =# | . | PERIOD | 110 | +!% | n | LOWERCASE N |
| 47 | =% | / | SLASH / DIVIDE SIGN | 111 | +!= | o | LOWERCASE O |
| 48 | == | 0 | ZERO | 112 | +!0 | p | LOWERCASE P |
| 49 | =0 | 1 | ONE | 113 | ++! | q | LOWERCASE Q |
| 50 | 0! | 2 | TWO | 114 | +++ | r | LOWERCASE R |
| 51 | 0+ | 3 | THREE | 115 | ++* | s | LOWERCASE S |
| 52 | 0* | 4 | FOUR | 116 | ++# | t | LOWERCASE T |
| 53 | 0# | 5 | FIVE | 117 | ++% | u | LOWERCASE U |
| 54 | 0% | 6 | SIX | 118 | ++= | v | LOWERCASE V |
| 55 | 0= | 7 | SEVEN | 119 | ++0 | w | LOWERCASE W |
| 56 | 00 | 8 | EIGHT | 120 | +*! | x | LOWERCASE X |
| 57 | !!! | 9 | NINE | 121 | +*+ | y | LOWERCASE Y |
| 58 | !!+ | : | COLON | 122 | +** | z | LOWERCASE Z |
| 59 | !!* | ; | SEMI-COLON | 123 | +*# | { | LEFT BRACE |
| 60 | !!# | < | LESS THAN SIGN | 124 | +*% | ! | VERTICAL BAR |
| 61 | !!% | = | EQUAL SIGN | 125 | +*= | } | RIGHT BRACE |
| 62 | !!= | > | GREATER THAN SIGN | 126 | +*0 | ~ | TILDE |
| 63 | !!0 | ? | QUESTION MARK | 127 | +#! | FF |  |

TABLE 7

For a BASE 8 or octal system (we shall represent our BASE 8 characters as '!', '+', '*', '#', '%', '=', '?', '0') we will have one switch for each of the octal characters plus one SEND switch for a total of nine switches.

| DEC BASE 10 | OCTAL BASE 8 | ASCII BASE 128 | SYMBOL DESCRIPTION | DECIMAL BASE 10 | OCTAL BASE 8 | ASCII BASE 128 | SYMBOL DESCRIPTION |
|---|---|---|---|---|---|---|---|
| 0 |  | NULL | NULL | 64 | ?0 | @ | AT SIGN |
| 1 | ! | Ctrl A | CONTROL A | 65 | 0! | A | UPPERCASE A |
| 2 | + | Ctrl B | CONTROL B | 66 | 0+ | B | UPPERCASE B |
| 3 | * | Ctrl C | CONTROL C | 67 | 0* | C | UPPERCASE C |
| 4 | # | Ctrl D | CONTROL D | 68 | 0# | D | UPPERCASE D |
| 5 | % | Ctrl E | CONTROL E | 69 | 0% | E | UPPERCASE E |
| 6 | = | Ctrl F | CONTROL F | 70 | 0= | F | UPPERCASE F |
| 7 | ? | <BELL> | CONTROL G | 71 | 0? | G | UPPERCASE G |
| 8 | 0 | <BS> | BACKSPACE | 72 | 00 | H | UPPERCASE H |
| 9 | !! | <HTAB> | HORIZONTAL TAB | 73 | !!! | I | UPPERCASE I |
| 10 | !+ | <LF> | LINEFEED | 74 | !!+ | J | UPPERCASE J |
| 11 | !* | <VTAB> | VERTICAL TAB | 75 | !!* | K | UPPERCASE K |
| 12 | !# | <FF> | FORMFEED | 76 | !!# | L | UPPERCASE L |
| 13 | !% | <CR> | CARRIAGE RETURN | 77 | !!% | M | UPPERCASE M |
| 14 | != | Ctrl N | CONTROL N | 78 | !!= | N | UPPERCASE N |
| 15 | !? | Ctrl O | CONTROL O | 79 | !!? | O | UPPERCASE O |
| 16 | !0 | Ctrl P | CONTROL P | 80 | !!0 | P | UPPERCASE P |
| 17 | +! | Ctrl Q | CONTROL Q | 81 | !+! | Q | UPPERCASE Q |
| 18 | ++ | Ctrl R | CONTROL R | 82 | !++ | R | UPPERCASE R |
| 19 | +* | Ctrl S | CONTROL S | 83 | !+* | S | UPPERCASE S |
| 20 | +# | Ctrl T | CONTROL T | 84 | !+# | T | UPPERCASE T |
| 21 | +% | Ctrl U | CONTROL U | 85 | !+% | U | UPPERCASE U |
| 22 | += | Ctrl V | CONTROL V | 86 | !+= | V | UPPERCASE V |
| 23 | +? | Ctrl W | CONTROL W | 87 | !+? | W | UPPERCASE W |
| 24 | +0 | Ctrl X | CONTROL X | 88 | !+0 | X | UPPERCASE X |
| 25 | *! | Ctrl Y | CONTROL Y | 89 | !*! | Y | UPPERCASE Y |
| 26 | *+ | <EOF> | CONTROL Z | 90 | !*+ | Z | UPPERCASE Z |
| 27 | ** | <ESC> | ESCAPE | 91 | !** | [ | LEFT BRACKET |
| 28 | *# | Ctrl | CONTROL BACKSLASH | 92 | !*# |  | BACKSLASH |
| 29 | *% | Ctrl ] | CONTROL RGHT BRCKT | 93 | !*% | ] | RIGHT BRACKET |
| 30 | *= | Ctrl 6 | CONTROL SIX | 94 | !*= |  | CARET |
| 31 | *? | Ctrl — | CONTROL DASH | 95 | !*? | — | UNDERLINE |
| 32 | *0 | <SP> | SPACE | 96 | !*0 |  | SINGLE BACKQUOTE |
| 33 | #! | ! | EXCLAMATION MARK | 97 | !#! | a | LOWERCASE A |
| 34 | #+ | " | DOUBLE QUOTE | 98 | !#+ | b | LOWERCASE B |
| 35 | #* | # | NUMBER SIGN | 99 | !#* | c | LOWERCASE C |
| 36 | ## | $ | DOLLAR SIGN | 100 | !## | d | LOWERCASE D |
| 37 | #% | % | PERCENT / MODULUS SIGN | 101 | !#% | e | LOWERCASE E |
| 38 | #= | & | AMPERSAND | 102 | !#= | f | LOWERCASE F |
| 39 | #? | ' | SINGLE QUOTE | 103 | !#? | g | LOWERCASE G |
| 40 | #0 | ( | LEFT PARENTHESIS | 104 | !#0 | h | LOWERCASE H |
| 41 | %! | ) | RIGHT PARENTHESIS | 105 | !%! | i | LOWERCASE I |
| 42 | %+ | * | STAR / MULTIPLY SIGN | 106 | !%+ | j | LOWERCASE J |
| 43 | %* | + | PLUS SIGN | 107 | !%* | k | LOWERCASE K |
| 44 | %# | , | COMMA | 108 | !%# | l | LOWERCASE L |
| 45 | %% | — | DASH / MINUS SIGN | 109 | !%% | m | LOWERCASE m |
| 46 | %=* | . | PERIOD | 110 | !%= | n | LOWERCASE N |
| 47 | %? | / | SLASH / DIVIDE SIGN | 111 | !%? | o | LOWER CASE O |
| 48 | %0 | 0 | ZERO | 112 | !%0 | p | LOWERCASE P |
| 49 | =! | 1 | ONE | 113 | !=! | q | LOWERCASE Q |
| 50 | =+ | 2 | TWO | 114 | !=+ | r | LOWERCASE R |
| 51 | =* | 3 | THREE | 115 | !=* | s | LOWERCASE S |
| 52 | =# | 4 | FOUR | 116 | !=# | t | LOWERCASE T |
| 53 | =% | 5 | FIVE | 117 | !=% | u | LOWERCASE U |
| 54 | == | 6 | SIX | 118 | !== | v | LOWERCASE V |
| 55 | =? | 7 | SEVEN | 119 | !=? | w | LOWERCASE W |
| 56 | =0 | 8 | EIGHT | 120 | !=0 | x | LOWERCASE X |
| 57 | ?! | 9 | NINE | 121 | !?! | y | LOWERCASE Y |
| 58 | ?+ | : | COLON | 122 | !?+ | z | LOWERCASE Z |
| 59 | ?* | ; | SEMI-COLON | 123 | !?* | { | LEFT BRACE |
| 60 | ?# | < | LESS THAN SIGN | 124 | !?# | ! | VERTICAL BAR |
| 61 | ?% | = | EQUAL SIGN | 125 | !?% | } | RIGHT BRACE |
| 62 | ?= | > | GREATER THAN SIGN | 126 | !?= | ~ | TILDE |
| 63 | ?? | ? | QUESTION MARK | 127 | !?? | FF |  |

TABLE 8

An EXAMPLE of an OPTIMIZED BASE 3 or trinary system (we shall represent our BASE 3 (RADIX 3) characters as '!', '+', '0') in which the most used characters are organized to require the smallest number of reduced set characters.

| DEC BASE 10 | TRINARY BASE 3 | ASCII BASE 128 | SYMBOL DESCRIPTION | DECIMAL BASE 10 | TRINARY BASE 3 | ASCII BASE 128 | SYMBOL DESCRIPTION |
|---|---|---|---|---|---|---|---|
| 8 | ! | BS | BACKSPACE | 86 | !+0! | V | UPPERCASE V |
| 32 | + | SPC | SPACE | 87 | ++0! | W | UPPERCASE W |
| 10 | 0 | CR | ENTER | 88 | 0+0! | X | UPPERCASE X |
| 49 | !! | 1 | ONE | 89 | !00! | Y | UPPERCASE Y |
| 50 | +! | 2 | TWO | 90 | +00! | Z | UPPERCASE Z |
| 51 | 0! | 3 | THREE | 3 | 000! | C | CONTROL C ( C) |
| 52 | !+ | 4 | FOUR | 47 | !!+ | / | SLASH / DIVIDE SIGN |
| 53 | ++ | 5 | FIVE | 40 | +!+ | ( | LEFT PARENTHESIS |
| 54 | 0+ | 6 | SIX | 123 | 0!!+ | { | LEFT BRACE |
| 55 | !0 | 7 | SEVEN | 91 | !+!+ | [ | LEFT BRACKET |
| 56 | +0 | 8 | EIGHT | 60 | ++!+ | < | LESS THAN SIGN |
| 57 | 00 | 9 | NINE | 33 | 0+!+ | ! | EXCLAMATION MARK |
| 97 | !!! | a | LOWERCASE A | 44 | !0!+ | , | COMMA |
| 98 | +!! | b | LOWERCASE B | 35 | +0!+ | # | NUMBER SIGN |
| 99 | 0!! | c | LOWERCASE C | 64 | 00!+ | @ | AT SIGN |
| 100 | !+! | d | LOWERCASE D | 45 | !!++ | — | DASH / MINUS SIGN |
| 101 | ++! | e | LOWERCASE E | 94 | +!++ | | CARET |
| 102 | 0+! | f | LOWERCASE F | 42 | 0!++ | * | STAR / MULTIPLY SIGN |
| 103 | !0! | g | LOWERCASE G | 43 | !+++ | + | PLUS SIGN |
| 104 | +0! | h | LOWERCASE H | 61 | ++++ | = | EQUAL SIGN |
| 105 | 00! | i | LOWERCASE I | 126 | 0+++ | ~ | TILDE |
| 106 | !!+ | j | LOWERCASE J | 37 | !0++ | % | PERCENT / MODULUS SIG |
| 107 | +!+ | k | LOWERCASE K | 36 | +0++ | $ | DOLLAR SIGN |
| 108 | 0!+ | l | LOWERCASE L | 38 | 00++ | & | AMPERSAND |
| 109 | !++ | m | LOWERCASE M | 124 | !!0+ | | | VERTICAL BAR |
| 110 | +++ | n | LOWERCASE N | 96 | +!0+ | ` | SINGLE BACKQUOTE |
| 111 | 0++ | o | LOWERCASE O | 34 | 0!0+ | " | DOUBLE QUOTE |
| 112 | !0+ | p | LOWERCASE P | 39 | !+0+ | ' | SINGLE QUOTE |
| 113 | +0+ | q | LOWERCASE Q | 58 | ++0+ | : | COLON |
| 114 | 00+ | r | LOWERCASE R | 59 | 0+0+ | ; | SEMI-COLON |
| 115 | !!0 | s | LOWERCASE S | 63 | !00+ | ? | QUESTION MARK |
| 116 | +!0 | t | LOWERCASE T | 96 | +00+ | _ | UNDERLINE |
| 117 | 0!0 | u | LOWERCASE U | 27 | 000+ | ESC | ESCAPE |
| 118 | !+0 | v | LOWERCASE V | 92 | !!!0 | \ | BACKSLASH |
| 119 | ++0 | w | LOWERCASE W | 41 | +!!0 | ) | RIGHT PARENTHESIS |
| 120 | 0+0 | x | LOWERCASE X | 125 | 0!!0 | } | RIGHT BRACE |
| 121 | !00 | y | LOWERCASE Y | 93 | !+!0 | ] | RIGHT BRACKET |
| 122 | +00 | z | LOWERCASE Z | 62 | ++!0 | > | GREATER THAN SIGN |
| 48 | 000 | 0 | ZERO | | 0+!0 | | USER DEFINED |
| 65 | !!!! | A | UPPERCASE A | 46 | !0!0 | . | PERIOD |
| 66 | +!!! | B | UPPERCASE B | | +0!0 | | USER DEFINED |
| 67 | 0!!! | C | UPPERCASE C | | 00!0 | | USER DEFINED |
| 68 | !+!! | D | UPPERCASE D | | !!+0 | | USER DEFINED |
| 69 | ++!! | E | UPPERCASE E | | +!+0 | | USER DEFINED |
| 70 | 0+!! | F | UPPERCASE F | | 0!+0 | | USER DEFINED |
| 71 | !0!! | G | UPPERCASE G | 9 | !++0 | | TAB KEY |
| 72 | +0!! | H | UPPERCASE H | | +++0 | | USER DEFINED |
| 73 | 00!! | I | UPPERCASE I | | 0++0 | | USER DEFINED |
| 74 | !!+! | J | UPPERCASE J | | !0+0 | | USER DEFINED |
| 75 | +!+! | K | UPPERCASE K | | +0+0 | | USER DEFINED |
| 76 | 0!+! | L | UPPERCASE L | | 00+0 | | USER DEFINED |
| 77 | !++! | M | UPPERCASE M | | !!00 | | USER DEFINED |
| 78 | +++! | N | UPPERCASE N | | +!00 | | USER DEFINED |
| 79 | 0++! | O | UPPERCASE O | | 0!00 | | USER DEFINED |
| 80 | !0+! | P | UPPERCASE P | | !+00 | | USER DEFINED |
| 81 | +0+! | Q | UPPERCASE Q | | ++00 | | USER DEFINED |
| 82 | 00+! | R | UPPERCASE R | | 0+00 | | USER DEFINED |
| 83 | !!0! | S | UPPERCASE S | | !000 | | USER DEFINED |
| 84 | +!0! | T | UPPERCASE T | | +000 | | USER DEFINED |
| 85 | 0!0! | U | UPPERCASE U | | 0000 | | USER DEFINED |

TABLE 9

An EXAMPLE of an OPTIMIZED BASE 5 or quinary system (we shall represent our BASE 5 (RADIX 5) characters as '!', '+', '*', '#', & '0') in which the most used characters are organized to require the smallest number of reduced set characters.

| DEC BASE 10 | QUINT BASE 5 | ASCII BASE 128 | SYMBOL DESCRIPTION | DEC BASE 10 | QUINT BASE 5 | ASCII BASE 128 | SYMBOL DESCRIPTION |
|---|---|---|---|---|---|---|---|
| 8 | ! | BS | BACKSPACE | 94 | ++0 | | CARET |
| 32 | + | SPC | SPACE | 59 | +*! | ; | SEMI-COLON |
| 13 | * | CR | ENTER | 43 | +*+ | + | PLUS SIGN |

TABLE 9-continued

An EXAMPLE of an OPTIMIZED BASE 5 or quinary system (we shall represent our BASE 5 (RADIX 5) characters as '!', '+', '*', '#', & '0') in which the most used characters are organized to require the smallest number of reduced set characters.

| DEC BASE 10 | QUINT BASE 5 | ASCII BASE 128 | SYMBOL DESCRIPTION | DEC BASE 10 | QUINT BASE 5 | ASCII BASE 128 | SYMBOL DESCRIPTION |
|---|---|---|---|---|---|---|---|
| 9 | # | <TAB> | TAB | 33 | +** | ! | EXCLAMATION MARK |
| 27 | 0 | <ESC> | ESCAPE | 46 | +*# | . | PERIOD |
| 49 | !! | 1 | ONE | 96 | +*0 | ` | SINGLE BACKQUOTE |
| 50 | !+ | 2 | TWO | 124 | +#! | \| | VERTICAL BAR |
| 51 | !* | 3 | THREE | 92 | +#+ | \ | BACKSLASH |
| 52 | !# | 4 | FOUR | 41 | +#* | ) | RIGHT PARENTHESIS |
| 53 | !0 | 5 | FIVE | 125 | +## | } | RIGHT BRACE |
| 54 | +! | 6 | SIX | 93 | +#0 | ] | RIGHT BRACKET |
| 55 | ++ | 7 | SEVEN | 62 | +0! | > | GREATER THAN SIGN |
| 56 | +* | 8 | EIGHT | 27 | +0+ | ESC | ESCAPE |
| 57 | +# | 9 | NINE | 36 | +0* | $ | DOLLAR SIGN |
| 48 | +0 | 0 | ZERO | 37 | +0# | % | PERCENT / MOD SIGN |
| 58 | *! | : | COLON | 95 | +00 | — | UNDERLINE |
| 45 | *+ | - | DASH / MINUS SIG | 65 | *!! | A | UPPERCASE A |
| 63 | ** | ? | QUESTION MARK | 66 | *!+ | B | UPPERCASE B |
| 44 | *# | , | COMMA | 67 | *!* | C | UPERCASE C |
| 39 | *0 | ' | SINGLE QUOTE | 68 | *!# | D | UPPERCASE D |
| 34 | #! | " | DOUBLE QUOTE | 69 | *!0 | E | UPPERCASE E |
| 47 | #+ | / | SLASH / DIVIDE S | 70 | *+! | F | UPPERCASE F |
| 40 | #* | ( | LEFT PARENTHESIS | 71 | *++ | G | UPPERCASE G |
| 123 | ## | { | LEFT BRACE | 72 | *+* | H | UPPERCASE H |
| 91 | #0 | [ | LEFT BRACKET | 73 | *+# | I | UPPERCASE I |
| 60 | 0! | < | LESS THAN SIGN | 74 | *+0 | J | UPPERCASE J |
| 64 | 0+ | @ | AT SIGN | 75 | **! | K | UPPERCASE K |
| 35 | 0* | # | NUMBER SIGN | 76 | **+ | L | UPPERCASE L |
| 42 | 0# | * | STAR / MULTIPLY SIGN | 77 | *** | M | UPPERCASE M |
| 38 | 00 | & | AMPERSAND | 78 | **# | N | UPPERCASE N |
| 97 | !!! | a | LOWERCASE A | 79 | **0 | O | UPPERCASE O |
| 98 | !!+ | b | LOWERCASE B | 80 | *#! | P | UPPERCASE P |
| 99 | !!* | c | LOWERCASE C | 81 | *#+ | Q | UPPERCASE Q |
| 100 | !!# | d | LOWERCASE D | 82 | *#* | R | UPPERCASE R |
| 101 | !!0 | e | LOWERCASE E | 83 | *## | S | UPPERCASE S |
| 102 | !+! | f | LOWERCASE F | 84 | *#0 | T | UPPERCASE T |
| 103 | !++ | g | LOWERCASE G | 85 | *0! | U | UPPERCASE U |
| 104 | !+* | h | LOWERCASE H | 86 | *0+ | V | UPPERCASE V |
| 105 | !+# | i | LOWERCASE I | 87 | *0* | W | UPPERCASE W |
| 106 | !+0 | j | LOWERCASE J | 88 | *0# | X | UPPERCASE X |
| 107 | !*! | k | LOWERCASE K | 89 | *00 | Y | UPPERCASE Y |
| 108 | !*+ | l | LOWERCASE L | 90 | #!! | Z | UPPERCASE Z |
| 109 | !** | m | LOWERCASE M | 2 | #!+ | Ctrl B | CONTROL B |
| 110 | !*# | n | LOWERCASE N | 3 | #!* | Ctrl C | CONTROL C |
| 111 | !*0 | o | LOWERCASE O | 4 | #!# | Ctrl D | CONTROL D |
| 112 | !#! | p | LOWERCASE P | 5 | #!0 | Ctrl E | CONTROL E |
| 113 | !#+ | q | LOWERCASE Q | 6 | #+! | Ctrl F | CONTROL F |
| 114 | !#* | r | LOWERCASE R | 7 | #++ | <BELL> | CONTROL G |
| 115 | !## | s | LOWERCASE S | 8 | #+* | <BS> | BACKSPACE |
| 116 | !#0 | t | LOWERCASE T | 9 | #+# | <HTAB> | HORIZONTAL TAB |
| 117 | !0! | u | LOWERCASE U | 10 | #+0 | <LF> | LINEFEED |
| 118 | !0+ | v | LOWERCASE V | 11 | #*! | <VTAB> | VERTICAL TAB |
| 119 | !0* | w | LOWERCASE W | 12 | #*+ | <FF> | FORMFEED |
| 120 | !0# | x | LOWERCASE X | 13 | #** | <CR> | CARRIAGE RETURN |
| 121 | !00 | y | LOWERCASE Y | 14 | #*# | Ctrl N | CONTROL N |
| 122 | +!! | z | LOWERCASE Z | 15 | #*0 | Ctrl O | CONTROL O |
| 126 | +!+ | ~ | TILDE | 16 | ##! | Ctrl P | CONTROL P |
| 23 | +!* | Ctrl W | CONTROL W | 17 | ##+ | Ctrl Q | CONTROL Q |
| 24 | +!# | Ctrl X | CONTROL X | 18 | ##* | Ctrl R | CONTROL R |
| 25 | +!0 | Ctrl Y | CONTROL Y | 19 | ### | Ctrl S | CONTROL S |
| 1 | +*! | Ctrl A | CONTROL A | 20 | ##0 | Ctrl T | CONTROL T |
| 26 | +++ | <EOF> | CONTROL Z | 21 | #0! | Ctrl U | CONTROL U |
|  | ++* |  | USER DEFINED | 22 | #0+ | Ctrl V | CONTROL V |
|  | ++# |  | USER DEFINED |  |  |  |  |

The embodiments of the invention in which an exclusive property or privilege is claimed are defined as follows:

1. A character input/pointing and positioning device for a computer, comprising:
   (a) a substantially planar centre plate:
   (b) selection recognition means arranged around said centre plate;
   (c) a disk centred at and slidably movable about said centre plate in a plane parallel to said centre plate such that said disk may be moved toward said selection recognition means to make a selection, said disk having a top cavity such that a tip of a pointed instrument may be inserted into said cavity and confined thereby to control the movement of said disk.

2. A character input/pointing and positioning device for a computer, comprising:
   (a) a substantially planar centre plate;

(b) selection recognition means arranged around said centre plate substantially perpendicular to said centre plate such that a tip of a pointed instrument may centered at and slidably moved about said centre plate in a plane parallel to said centre plate to move said tip of said pointed instrument toward said selection recognition means to make a selection, movement of said tip of said pointed instrument being confined by said selection recognition means.

3. A character input device as defined in claim 1, wherein said selection recognition means is comprised of a plurality of switches.

4. A character input device as defined in claim 1, wherein said selection recognition means is comprised of a plurality of zones, with means for measuring the direction and threshold magnitude of movement to determine whether a selection has been made.

5. The character input device as defined in claim 1, having means for signalling to said computer the end of a transmission sequence.

6. The character input device as defined in claim 3, having one additional switch which is dedicated to signalling to said computer the end of a transmission sequence.

7. The character input device as defined in claim 4, having one additional zone which is dedicated to signalling to said computer the end of a transmission sequence.

8. A character input/pointing and positioning device for a computer, comprising:
 a. three or more conductive plates surrounding a substantially planar charged centre plate; and
 b. a disk having a conductive bottom or side surface and an insulated top cavity, centred upon and slidably movable about said centre plate such that a tip of a pointed instrument may be inserted into said cavity to control movement of said disk in a plane parallel to that of said centre plate bringing said conductive surface of said disk into contact with one of said conductive plates to complete an electrical circuit with said centre plate.

9. A character input/pointing and positioning device for a computer, comprising:
 a. three or more membrane switches, each of said membrane switches having two contact surfaces; arranged around a substantially planar centre plate, such that each of said membrane switches may be activated by a tip of a pointed instrument slidably movable in a plane parallel to that of said centre plate by pressing on a selected membrane switch such that said contact surfaces come into contact completing an electrical circuit; and said membrane switches being arranged substantially perpendicular to said centre plate to confine movement of said tip of said pointed instrument.

10. The character input/pointing and positioning device for a computer, comprising:
 a. three or more membrane switches, each of said membrane switches having two contact surfaces arranged around a substantially planar centre plate;
 b. a movable disk having a top cavity, said disk being slidable on said centre plate such that a tip of a pointed instrument may be inserted into said cavity to control movement of said disk in a plane parallel to that of said centre plate whereby each of said membrane switches may be activated by said disk by pressing on a selected membrane switch such that said contact surfaces come into contact completing an electrical circuit.

11. A character input/pointing and positioning device for a computer, comprising:
 a. a support in the form of a substantially planar centre plate;
 b. two strain gauges mounted to a resilient material which rests upon and is affixed to the edges of said support, said strain gauges being arranged at varying angles such that they measure forces applied in differing directions, thereby defining input zones on said resilient material;
 c. means to confine placement of a tip of a pointed instrument positioned on said resilient material such that a tip of a pointed instrument may be inserted in said placement means to apply a force in a plane parallel to that of the support whereby said strain gauges measure the direction and threshold magnitude of said force to determine whether a selection has been made.

12. A character input/pointing and positioning device for a computer, comprising:
 a. a base in the form of a substantially planar centre plate;
 b. a cantilever beam having one end fixed to said base and an opposed end extending perpendicularly from said base;
 c. two strain gauges mounted to opposed sides of said cantilever beam such that they measure forces applied in differing directions in relation to the vertical orientation of said cantilever beam, thereby defining input zones in relation to the positioning of said cantilever beam;
 d. means to confine placement of a tip of a pointed instrument positioned on said opposed end of said cantilever beam, such that a tip of a pointed instrument may be inserted into said placement means to apply a force in a plane parallel to that of said base, whereby said strain gauges measure the direction and threshold magnitude of movement of said cantilever beam to determine whether a selection has been made.

13. A character input/pointing and positioning device for a computer, comprising:
 a. two or more conductive plates surrounding a substantially planar charged centre plate, said conductive plates having a thin electrically insulating coating;
 b. a disk having a conductive bottom surface and an insulated top cavity, centred upon and slidably movable about said centre plate such that a tip of a pointed instrument may be inserted into said cavity to control movement of said disk whereby changes in capacitance may be effected by movement of said disk in a plane parallel to said centre plate in relation to zones defined by the positioning of said conductive plates; and
 c. means for measuring the threshold magnitude of changes in capacitance upon movement of said disk, in relation to a starting capacitance level when said disk is centred on said plate, to determine whether a selection has been made.

14. A character input/pointing and positioning device for a computer, comprising:
 a. three or more membrane capacitors arranged around a substantially planar centre plate, each of said membrane capacitors having two contact surfaces separated by a thin electrically insulating material; said membrane capacitors being adapted to be activated by by a tip of a pointed instrument slidably movable in a plane parallel to said centre plate by pressing on a selected membrane capacitor thereby increasing the capacitance of said capacitor;

b. means for measuring the threshold magnitude of changes in capacitance when said contact surface come closer together to determine whether a selection has been made; said membrane capacitors being arranged substantially perpendicular to said centre plate to confine movement of said tip of said pointed instrument.

15. A character input/pointing and positioning device for a computer, comprising:

a. three or more hall effect sensors arranged around a substantially planar centre plate;

b. a movable disk having a top cavity and a magnetic bottom surface, said disk being slidably movable on said centre plate, such that a tip of a pointed instrument may be inserted into said cavity to control movement of said disk whereby changes in voltage may be effected upon movement of said disk in a plane parallel to said centre plate toward one of said sensors; and c. means for measuring the threshold magnitude of changes in voltage upon movement of said disk, in relation to a starting voltage level, to determine whether selection has been made.

16. A character input/pointing and positioning device for a computer, comprising:

a. three or more photo-transistors surrounding a light emitting diode;

b. a disk having a top cavity and a concave reflective bottom surface, centered upon and slidably movable about said diode such that a tip of a pointed instrument may be inserted into said cavity to control movement of said disk as said disk is moved in a plane parallel to said diode toward one of said photo-transistors light is reflected by said disk from said diode to said photo-transistor thereby increasing the voltage in said photo-transistor; and c. means for measuring the threshold magnitude of changes in voltage upon movement of said disk, in relating to a starting voltage level when said disk is centered on said diode, to determine whether a selection has been made.

17. A character input/pointing and positioning device for a computer, comprising:

a. three or more photo-transistors and light emitting diode pairs, arranged around a substantially planar centre plate said pairs being arranged such that a beam of light from each of said diodes is focused on one of said photo-transistors; and b. a movable disk having a top cavity, slidably movable on said centre plate such that a tip of a pointed instrument may be inserted into said cavity to control movement of said disk whereby movement of said disk in a plane parallel to said centre plate results in the beam of light between one of said photo-transistor and light emitting diode pairs being disrupted.

18. A character input/pointing and positioning device for a computer, comprising:

a. three or more conductive plates surrounding a substantially planar charged centre plate;

b. a disk centred upon and slidably movable about said centre plate, said disk being encased in a thin sheet of carbon impregnated elastomer material which is bonded to said conductive plates and having a top cavity such that a tip of a pointed instrument may be inserted into said cavity to control movement of said disk whereby movement of said disk in a plane parallel to said centre plate by compression of said elastomer material within zones defined by the positioning of said conductive plates effects a change in voltage; and c. means for measuring the threshold magnitude of changes in voltage upon movement of said disk, in relation to a starting voltage level with said disk centred on said centre plate, to determine whether a selection has been made.

19. A character input device as defined in claim 2, wherein said selection recognition means is comprised of a plurality of switches.

20. A character input device as defined in claim 2, wherein said selection recognition means is comprised of a plurality of zones, with means for measuring the direction and threshold magnitude of movement to determine whether a selection has been made.

21. The character input device as defined in claim 2, having means for signalling to said computer the end of a transmission sequence.

* * * * *